United States Patent
Nakanishi

(10) Patent No.: US 8,010,490 B2
(45) Date of Patent: Aug. 30, 2011

(54) APPARATUS FOR MANAGING REMOTE COPYING BETWEEN STORAGE SYSTEMS

(75) Inventor: Masashi Nakanishi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 708 days.

(21) Appl. No.: 12/025,241

(22) Filed: Feb. 4, 2008

(65) Prior Publication Data

US 2009/0125691 A1 May 14, 2009

(30) Foreign Application Priority Data

Nov. 13, 2007 (JP) ................................ 2007-294936

(51) Int. Cl.
*G06F 7/00* (2006.01)

(52) U.S. Cl. ........................................ 707/636; 707/652

(58) Field of Classification Search .................. 711/161, 711/162, 170; 709/225; 707/636
See application file for complete search history.

(56) References Cited

U.S. PATENT DOCUMENTS

| | | | |
|---|---|---|---|
| 5,742,792 A * | 4/1998 | Yanai et al. .................... | 711/162 |
| 6,044,444 A * | 3/2000 | Ofek .............................. | 711/162 |
| 7,013,371 B2 * | 3/2006 | Watanabe et al. ............. | 711/161 |
| 7,055,059 B2 * | 5/2006 | Yanai et al. ........................ | 714/7 |
| 7,225,294 B2 | 5/2007 | Nagashima et al. | |
| 2002/0129216 A1 * | 9/2002 | Collins ........................... | 711/170 |
| 2004/0039816 A1 * | 2/2004 | Bae et al. ........................ | 709/225 |
| 2006/0136761 A1 * | 6/2006 | Frasier et al. .................. | 713/320 |
| 2006/0212668 A1 * | 9/2006 | Furukawa et al. ............. | 711/162 |
| 2006/0242454 A1 * | 10/2006 | Bae et al. ............................ | 714/4 |
| 2007/0150692 A1 | 6/2007 | Nagashima et al. | |

FOREIGN PATENT DOCUMENTS

JP 2004-264973 9/2004

* cited by examiner

*Primary Examiner* — Cheyne D Ly
(74) *Attorney, Agent, or Firm* — Antonelli, Terry, Stout & Kraus, LLP.

(57) ABSTRACT

A resource status value, which shows the resource status of a resource to be utilized in a remote copy that conforms to a copy mode configured for a copy unit created from a first data volume and a second data volume, is acquired either regularly or irregularly. A determination is made as to whether or not the acquired resource status value exceeds a prescribed threshold, and when it is determined that the acquired resource status value exceeds this prescribed threshold, either the resource to be used for a remote copy conforming to a configured copy mode is increased, or the configured copy mode is changed to a different copy mode.

7 Claims, 17 Drawing Sheets

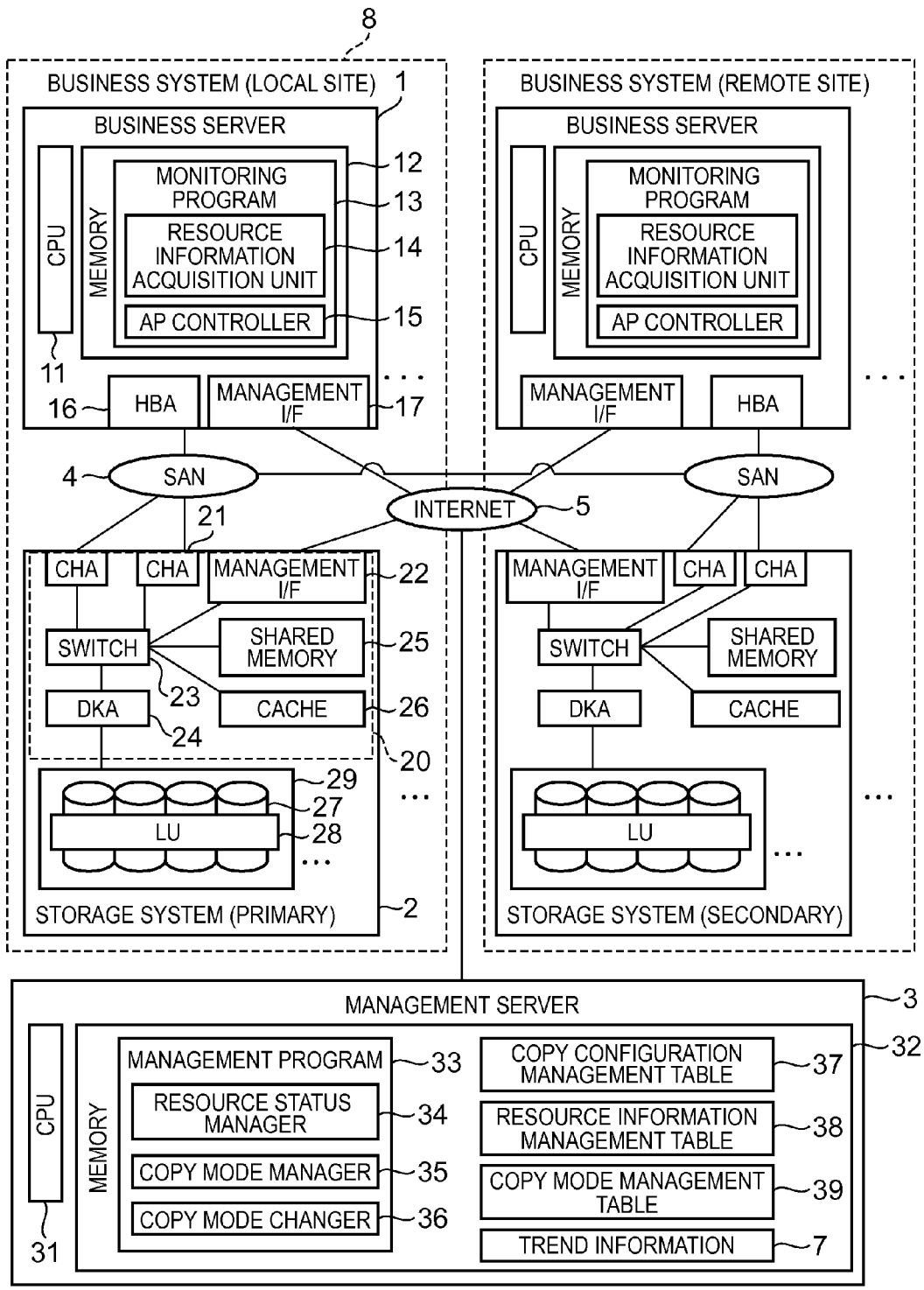

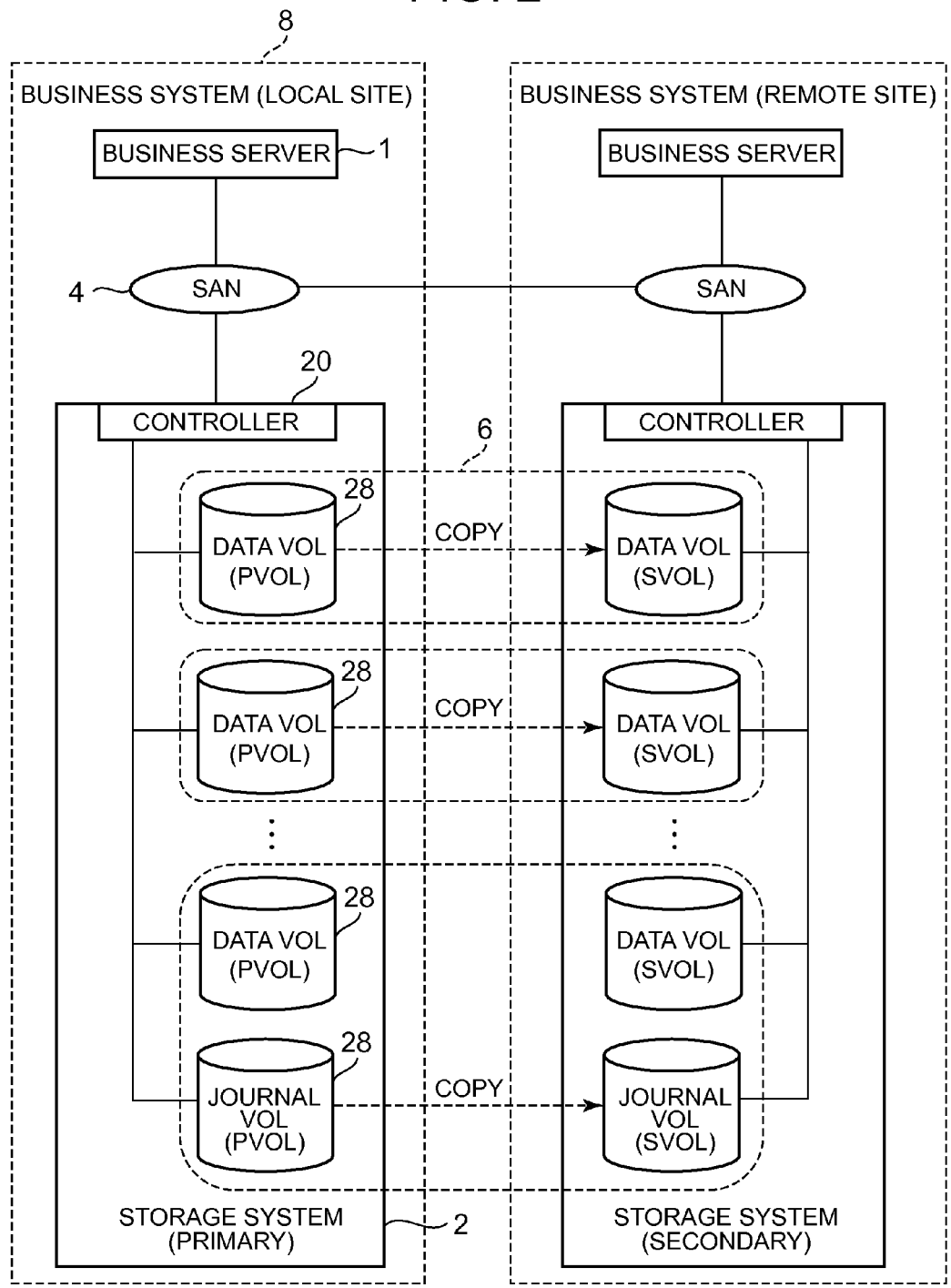

FIG. 4

COPY CONFIGURATION MANAGEMENT TABLE 37

| COPY ID | COPY MODE | PVOL | | | SVOL | | |
|---|---|---|---|---|---|---|---|
| | | SERIAL | LDEV | HOST NAME | SERIAL | LDEV | HOST NAME |
| C0001 | SYNCHRONOUS | 55014 | 423 | HOST A | 15005 | 100 | HOST 1 |
| C0002 | ASYNCHRONOUS C | 55014 | 509 | HOST B | 15005 | 200 | HOST 2 |
| C0003 | ASYNCHRONOUS J | 55014 | 928 | HOST C | 15005 | 300 | HOST 3 |
| ⋮ | ⋮ | ⋮ | ⋮ | ⋮ | ⋮ | ⋮ | ⋮ |

| APPLICATION | RESOURCE | | |
|---|---|---|---|
| | NETWORK | CACHE | JOURNAL |
| DBMS | R0001 | – | – |
| MAIL | R0004 | R0002 | – |
| FILE SYSTEM | R0005 | – | R0003 |
| ⋮ | ⋮ | ⋮ | ⋮ |

FIG. 5

RESOURCE INFORMATION MANAGEMENT TABLE 38

| RESOURCE ID | TYPE | SCOPE | TREND INFORMATION LINK |
|---|---|---|---|
| R0001 | NETWORK | PAIR | T0001 |
| R0002 | CACHE | STORAGE | T0002 |
| R0003 | JOURNAL | PAIR | T0003 |
| ⋮ | ⋮ | ⋮ | ⋮ |

FIG. 6

TREND INFORMATION TABLE 7A

| TREND ID = T0001 | RESOURCE TYPE = NETWORK | |
|---|---|---|
| TIME | RESOURCE STATUS (TRANSFER TIME (SECONDS)) | WARNING THRESHOLD OVERRUN RECORD |
| 2007/04/23 01:02:03 | 5 | 0 |
| 2007/04/23 01:02:04 | 3 | 0 |
| 2007/04/23 01:02:05 | 1 | 0 |
| ⋮ | ⋮ | ⋮ |

FIG. 7

TREND INFORMATION TABLE 7B

| TREND ID = T0002 | RESOURCE TYPE = CACHE | |
|---|---|---|
| TIME | RESOURCE STATUS (CACHE RESIDUAL CAPACITY (MB)) | WARNING THRESHOLD OVERRUN RECORD |
| 2007/04/23 01:02:03 | 80.00 | 1 |
| 2007/04/23 01:02:04 | 150.00 | 0 |
| 2007/04/23 01:02:05 | 200.00 | 0 |
| : | : | : |

FIG. 8

TREND INFORMATION TABLE 7C

| TREND ID = T0003 | RESOURCE TYPE = JOURNAL | |
|---|---|---|
| TIME | RESOURCE STATUS (JOURNAL RESIDUAL CAPACITY (GB)) | WARNING THRESHOLD OVERRUN RECORD |
| 2007/04/23 01:02:03 | 10.6 | 0 |
| 2007/04/23 01:02:04 | 10.5 | 0 |
| 2007/04/23 01:02:05 | 10.4 | 0 |
| : | : | : |

FIG. 9

COPY MODE MANAGEMENT TABLE 39

| COPY ID (391) | COPY MODE (392) | PREVIOUS COPY MODE (393) | PREVIOUS CHANGE TIME (394) | PREVIOUS DETERMINATION TIME (395) | NUMBER-OF-OVERRUNS COUNT START TIME (396) |
|---|---|---|---|---|---|
| C0001 | SYNCHRONOUS | ASYNCHRONOUS J | 2007/12/12 17:10:00 | 2007/04/23 01:00:00 | 2007/04/23 00:00:00 |
| C0002 | ASYNCHRONOUS C | — | — | 2007/04/23 01:00:00 | 2007/04/23 00:00:00 |
| C0003 | ASYNCHRONOUS J | SYNCHRONOUS | 2007/04/01 03:30:00 | 2007/04/23 01:00:00 | 2007/04/23 00:00:00 |
| .. | .. | .. | .. | .. | .. |

| WARNING THRESHOLD (397) | DANGER THRESHOLD (398) | NUMBER OF OVERRUNS (399) | OVERRUN LIMIT (390) | (39A) | TREND ESTIMATE (39B) | AUTOMATIC RESOURCE EXPANSION (39C) |
|---|---|---|---|---|---|---|
| 30 (SECONDS) | 60 (SECONDS) | 0 | 1 | PREFERRED ASYNCHRONOUS | INVALID | — |
| 100.00 (MB) | 50.00 (MB) | 2 | 3 | RESIDUAL CAPACITY PREFERRED | VALID | INVALID |
| 1.00 (GB) | 0.50 (GB) | 1 | 3 | ASYNCHRONOUS C PREFERRED | INVALID | VALID |
| .. | .. | .. | .. | PREVIOUS CONFIGURATION PREFERRED | .. | .. |

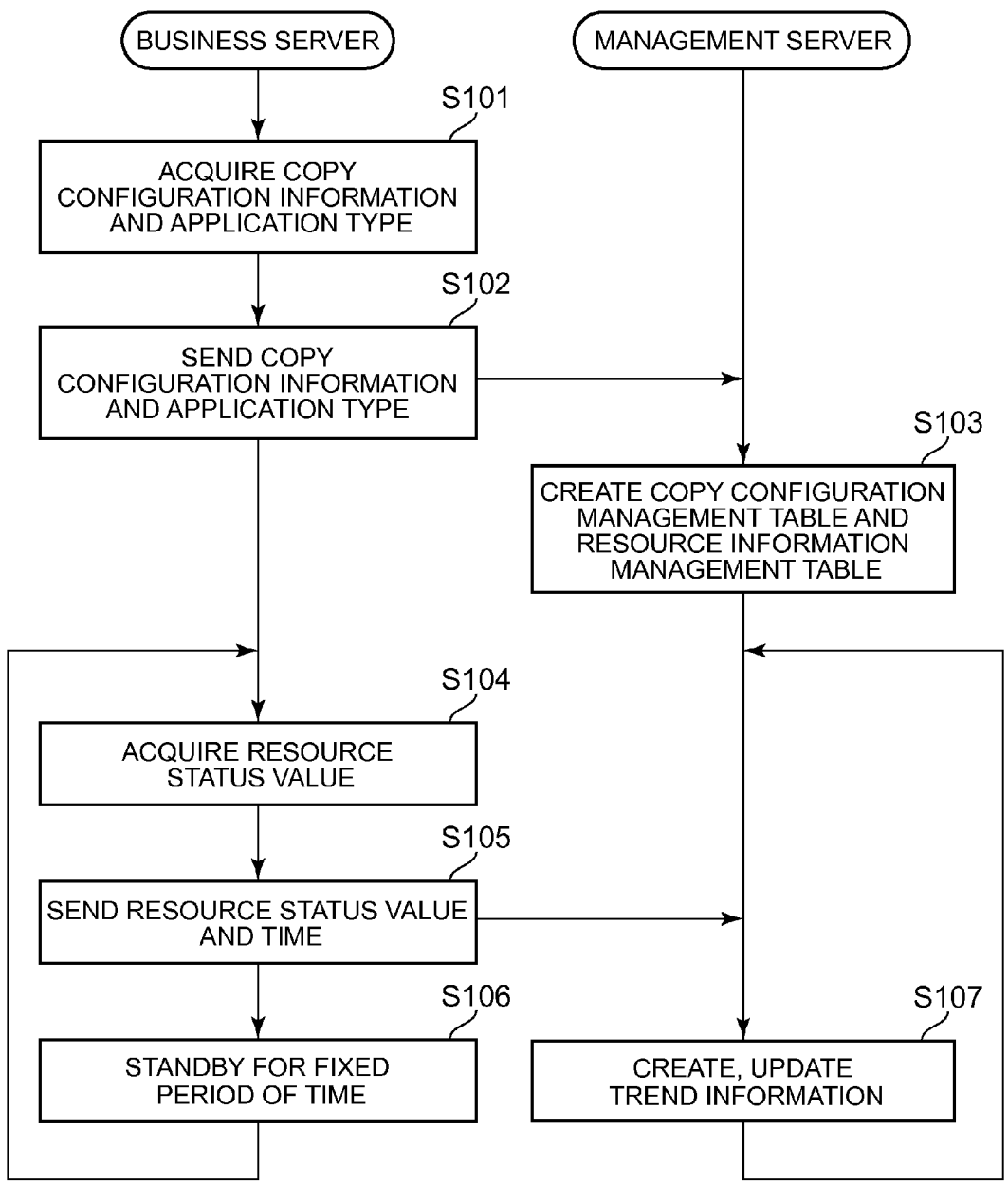

APPARATUS FOR MANAGING REMOTE COPYING BETWEEN STORAGE SYSTEMS

CROSS-REFERENCE TO PRIOR APPLICATION

This application relates to and claims the benefit of priority from Japanese Patent Application number 2007-294936, filed on Nov. 13, 2007, the entire disclosure of which is incorporated herein by reference.

BACKGROUND OF THE INVENTION

1. Field of the Invention

The present invention relates to technology for managing remote copying between storage systems.

2. Description of the Related Art

As one technology heretofore used in storage systems, for example, a technology for copying data between the logical volumes of different storage systems, that is, a technology for carrying out a remote copy is known (Japanese Patent Laid-Open No. 2004-264973.

A remote-copy mode (hereinafter, "copy mode") can be any one of a variety of modes. The primary resource type (for example, a network, cache memory, or logical volume) affecting the success or failure of a remote copy or the performance of a remote copy will differ for each type of copy mode.

Also, the status of a resource affecting the success or failure of a remote copy or the performance of a remote copy will vary from hour to hour. Even if there were sufficient resources when a remote copy was initially started, and the remote copy was carried out normally, the occurrence of insufficient resources thereafter will mean that a remote copy cannot be carried out normally.

SUMMARY OF THE INVENTION

Accordingly, an object of the present invention is to provide technology that enables remote copying to be carried out normally on a continuous basis.

A resource status value, which shows the resource status of a resource to be utilized in a remote copy that conforms to a copy mode configured for a copy unit created from a first data volume and a second data volume, is acquired either regularly or irregularly. A determination is made as to whether or not the acquired resource status value exceeds a prescribed threshold, and when it is determined that the acquired resource status value exceeds this prescribed threshold, either the resource to be used for a remote copy conforming to a configured copy mode is increased, or the configured copy mode is changed to a different copy mode.

BRIEF DESCRIPTION OF THE DRAWINGS

FIG. 1 is a diagram showing an example of the constitution of a computer system related to this embodiment;

FIG. 2 is a diagram illustrating an overview of a remote copy carried out by this system;

FIG. 4 is a diagram showing an example of a copy configuration management table;

FIG. 5 is a diagram showing an example of a resource information management table 38;

FIG. 6 is a diagram showing an example of trend information related to a network resource;

FIG. 7 is a diagram showing an example of trend information related to a cache resource;

FIG. 8 is a diagram showing an example of trend information related to a journal resource;

FIG. 9 is a diagram showing an example of a copy mode management table;

FIG. 10 is a flowchart of the process by which a management program creates a copy configuration management table, a resource information management table, and trend information;

DETAILED DESCRIPTION OF THE PREFERRED EMBODIMENT

Figure 3A:
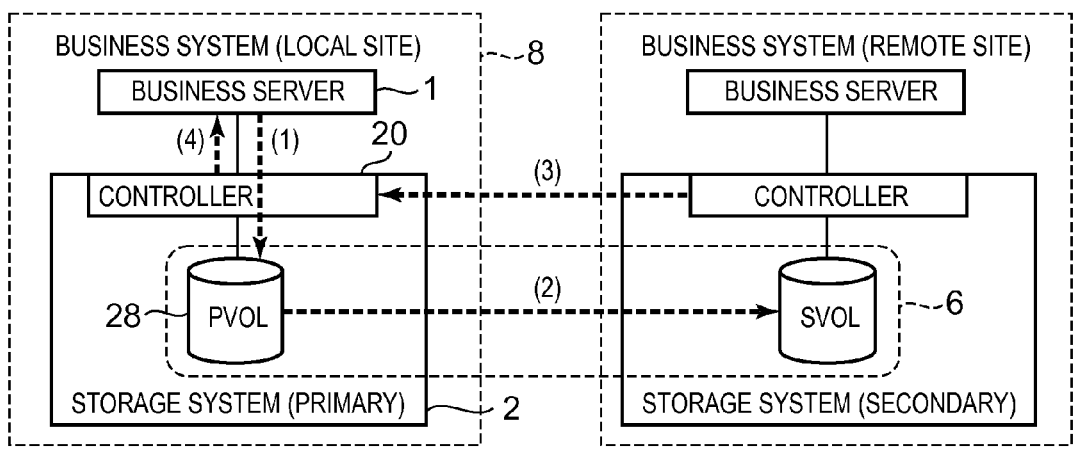
FIG. 3A is a diagram showing an overview of a synchronous copy.

In a first embodiment, a management apparatus for managing a remote copy, which is a data copy from a first data volume of a first storage system to a second data volume of a second storage system, comprises a monitoring unit, a determination unit, and an action unit. The monitoring unit either regularly or irregularly acquires a resource status value showing the resource status of a resource to be utilized in a remote copy conforming to a copy mode configured for a copy unit created from the above-mentioned first data volume and the above-mentioned second data volume. The determination unit determines whether or not the above-mentioned acquired resource status value exceeds a prescribed threshold. When the determination unit determines that the above-mentioned acquired resource status value exceeds the above-mentioned prescribed threshold, the action unit executes either a resource expansion process for increasing the resource used for a remote copy conforming to the above-mentioned configured copy mode, or a copy mode change process for changing the above-mentioned configured copy mode to a different copy mode.

The resource expansion process here, for example, is a process for sending a command for increasing a resource to a specified device (for example, the first storage system; a first host, which issues an I/O request to the first storage system; a first management computer for managing either the first storage system or the first host; the second storage system; a second host, which issues an I/O request to the second storage system; or a second management computer for managing either the second storage system or the second host). Further, for example, the copy mode change process, for example, is one, which sends a command to change to a different copy mode to the above-mentioned specified device.

In a second embodiment according to the first embodiment, a plurality of types of copy modes can be configured for the above-mentioned copy unit. The type of resource utilized is determined by the type of copy mode. The above-mentioned prescribed threshold is determined for each resource type.

In a third embodiment according to either the first or second embodiment, the above-mentioned prescribed threshold comprises a prescribed first threshold, and a prescribed second threshold, which is at a lower level than the above-mentioned prescribed first threshold. The above-mentioned action unit executes either the above-mentioned resource expansion process or the above-mentioned copy mode change process when the resource status value of the above-mentioned resource is determined to exceed the above-mentioned first threshold, or when the resource status value of the above-mentioned resource is determined not to exceed the above-mentioned first threshold, but the number of overruns, which is the number of times that the resource status value of the above-mentioned resource is determined to exceed the above-mentioned second threshold, exceeds a prescribed number of times.

As used here, "lower level than" does not necessarily mean that the value is small, but rather signifies that the value is a lower level. For example, if the first threshold corresponds to a type of resource for which a smaller value signifies insufficient resources, the second threshold will be a value that is larger than the first threshold.

In a fourth embodiment according to the third embodiment, the management apparatus further comprises a counter for counting the above-mentioned number of overruns; and a copy mode decision unit, which executes a copy mode decision process for deciding a candidate for the above-mentioned different copy mode in the above-mentioned copy mode change process, when the above-mentioned number of overruns does not exceed the prescribed number of times. Either when it is determined that the resource status value of the above-mentioned resource exceeds the above-mentioned first threshold, or when the above-mentioned number of overruns exceeds the prescribed number of times, the above-mentioned action unit executes the above-mentioned copy mode change process, which uses the candidate decided by the above-mentioned copy mode decision process as the above-mentioned different copy mode.

In a fifth embodiment according to any of the first through the fourth embodiments, the plurality of types of copy modes configurable for the above-mentioned copy unit comprises a first type copy mode used by a first type resource, which is a first data storage area of the above-mentioned first storage system; and a second type copy mode used by a second type resource that differs from the above-mentioned first type resource. Resource expansion information showing whether or not the above-mentioned first type resource expands when determination is made that the resource status value of the above-mentioned first type resource exceeds a prescribed threshold determined for the above-mentioned first type resource is configured for the above-mentioned copy unit. When it is determined that the resource status value of the above-mentioned first type resource exceeds the prescribed threshold determined for the above-mentioned first type resource, the above-mentioned action unit executes the above-mentioned resource expansion process for increasing the above-mentioned first type resource, or the above-mentioned copy mode change process for changing the copy mode configured for the above-mentioned copy unit from the above-mentioned first type copy mode to the above-mentioned second type copy mode.

In a sixth embodiment according to the fifth embodiment, the plurality of types of copy modes configurable for the above-mentioned copy unit comprise a synchronous copy by which the above-mentioned first data volume and the above-mentioned second data volume are synchronized; a cache asynchronous copy, which is an asynchronous remote copy, which uses a storage area in a first cache of the above-mentioned first storage system as a buffer; and a journal asynchronous copy, which is an asynchronous remote copy, which uses a storage area in a logical volume of the above-mentioned first storage system as a buffer, and which uses an updated journal for the above-mentioned first data volume. The above-mentioned first type copy mode is either the above-mentioned cache asynchronous copy or the above-mentioned journal asynchronous copy. The above-mentioned second type copy mode is either the above-mentioned synchronous copy, the above-mentioned cache asynchronous copy, or the above-mentioned journal asynchronous copy.

In a seventh embodiment according to any of the first through the fifth embodiments, the plurality of types of copy modes configurable for the above-mentioned copy unit comprise a first type copy mode used by a first type resource, which is a first type data storage area of the above-mentioned first storage system; a second type copy mode used by a second type resource, which is a second type data storage area of the above-mentioned first storage system; and a third type copy mode, which decides that a third type resources is to be used. When the resource status value of the above-mentioned third type resource is determined to exceed the prescribed threshold determined for the above-mentioned third type resource, the above-mentioned action unit compares the percentage of an unused area of the above-mentioned first type data storage area, which is the above-mentioned first type resource, with the percentage of an unused area of the above-mentioned second type data storage area, which is the above-mentioned second type resource, and selects the copy mode, which uses the resource that has the higher percentage of the above-mentioned unused area thereof, as the above-mentioned different copy mode in the above-mentioned copy mode change process.

In an eighth embodiment according to the seventh embodiment, the plurality of types of copy modes configurable for the above-mentioned copy unit comprise a synchronous copy by which the above-mentioned first data volume and the above-mentioned second data volume are synchronized; a cache asynchronous copy, which is an asynchronous remote copy, which uses a storage area in a first cache of the above-mentioned first storage system as a buffer; and a journal asynchronous copy, which is an asynchronous remote copy, which uses a storage area in a logical volume of the above-mentioned first storage system as a buffer, and uses an update journal for the above-mentioned first data volume. The above-mentioned third type copy mode is the above-mentioned synchronous copy. The above-mentioned first type copy mode is the above-mentioned cache asynchronous copy. The above-mentioned second type copy mode is the above-mentioned journal asynchronous copy.

In a ninth embodiment according to any of the first through the fourth embodiments, the management apparatus further comprises a previous copy mode storage unit. The previous copy mode storage unit records the previous copy mode, which is the previously configured type copy mode for the above-mentioned copy unit, in a prescribed storage area. The above-mentioned action unit makes the above-mentioned previous copy mode stored in the above-mentioned prescribed storage area to be applied to the above-mentioned different copy mode in the above-mentioned copy mode change process when prescribed conditions match up.

At least one of the above-described monitoring unit, determination unit, action unit, counter, copy mode decision unit, and previous copy mode storage unit can be constructed by hardware, a computer program, or a combination thereof (for example, one part can be realized by a computer program, and the remainder can be realized via hardware). The computer program is executed by being read into a prescribed processor. Further, the memory or some other such storage region that resides in a hardware resource can be used as needed during information processing, when the computer program is carried out by being read into the processor. The computer program can be installed in the computer from a recording medium such as a CD-ROM, and it can also be downloaded to the computer via a communication network.

One embodiment of the present invention will be explained in detail hereinbelow while referring to the figures. Furthermore, in explaining this embodiment, sentences having computer program as the subject actually signify that processing is being carried out by the CPU, which is executing this computer program.

FIG. 1 is a diagram showing an example of the constitution of a computer system related to this embodiment.

A business server 1 and a storage system 2 are connected via a first communication network 4 (for example, a SAN (Storage Area Network)). At least one of the business server 1 or storage system 2 can be a plurality of units connected to the first communication network 4. A single business system 8, which carries out a prescribed job, is constructed from one or more business servers 1 and one or more storage systems 2.

The computer system related to this embodiment (hereinafter, "this system") comprises at least two business systems 8. Then, these business systems 8 are interconnected by connecting their respective first communication networks 4. In this embodiment, for convenience of explanation, it is supposed that this system comprises two business systems 8, and that these business systems 8 are interconnected. Remote copying is carried out between the interconnected business systems 8. That is, data stored in a data VOL (data volume) of the storage system 2 constituting the one business system 8 is copied at a prescribed timing to a data VOL of the storage system 2 constituting the other business system 8. Hereinafter, the copy-source data VOL will be called the "PVOL (primary volume)", and the copy-destination data VOL will be called the "SVOL (secondary volume)". Further, the storage system 2 comprising the PVOL will be called the "primary storage system 2", and the storage system 2 comprising the SVOL will be called the "secondary storage system 2". Furthermore, the business system 8 that has the primary storage system 2 as a component will be called the "local site 8", and the business system 8 that has the secondary storage system 2 as a component will be called the "remote site 8". Further, the copy timing (cycle) will be configured beforehand inside the primary storage system 2.

The respective business servers 1 and storage systems 2 comprising this system are connected to a management server 3 via a second communication network 5 (for example, the Internet). Furthermore, the first communication network and the second communication network can also be constituted as a single communication network.

The business server 1 is a computer for accessing a storage device 27 of the storage system 2 (an LU 28 provided by the storage system 2) in accordance with an indication from a client (not shown in the figure). The business server 1, for example, comprises an HBA (Host Bus Adapter) 16, which is an interface for connecting a CPU 11 and a memory 12 to the storage system 2; and a management I/F (interface) 17, which is an interface for connecting to the management server 3. The memory 12, for example, stores a prescribed application program (AP) (not shown in the figure), which is executed for carrying out a prescribed job, and a monitoring program 13. The monitoring program 13, for example, comprises a resource information acquisition unit 14 and an AP controller 15 as subprograms thereof. The processing carried out by the monitoring program 13 (resource information acquisition unit 14 and AP controller 15) will be explained in detail hereinbelow.

The storage system 2, for example, can be a RAID (Redundant Array of Independent (or Inexpensive) Disks) system comprising a large number of storage devices (for example, hard disk drives (HDD)) 27 arranged in an array. The storage device 27 is not limited to the HDD, but rather can be constituted from other types of media drives (for example, a flash memory drive), and can be a mixture of a plurality of types of media drives. The controller 20 for the storage system 2, for example, comprises a CHA (Channel Adapter) 21, a DKA (Disk Adapter) 24, a switch 23, a shared memory 25, a cache memory (hereinafter, referred to simply as the "cache") 26, and a management I/F 22, which is the interface for the management server 3. Access to the storage device 27 is controlled by the controller 20 of the storage system 2. Furthermore, for example, the functions of the storage system 2 controller 20 can be built into a FC (Fibre Channel) switch constituting the first communication network 4, and a storage system 2 can be realized by combining the FC switch with a plurality of storage devices 27.

The CHA 21 has one or a plurality of I/F (for example, a communication port, or a communication control circuit comprising a communication port) communicably connected to an external device (for example, the business server 1 or other storage system 2), and carries out data communications with the external device. The CHA 21 is constituted as a microcomputer system (for example, a circuit board) comprising a CPU and a memory. When there is a write request from the business server 1, the CHA 21, for example, respectively writes the write-targeted data to the cache 26, and the command received from the business server 1 to the shared memory 25. Further, when there is a read request from the business server 1, the CHA 21 writes the command received from the business server 1 to the shared memory 25, and sends the read-targeted data, which the DKA 24 read out from the storage device 27 and wrote to the cache 26, to the business server 1.

The DKA 24 has one or a plurality of drives I/F (for example, a communication port, or a communication control circuit comprising a communication port) communicably connected to the respective storage devices 27, and carries out data communications with the storage devices 27. The DKA 24 is constituted as a microcomputer system (for example, a circuit board) comprising a CPU and a memory. DKA 24, for example, writes write-targeted data written to the cache 26 from the CHA 21 to the storage device 27, and writes read-targeted data read out from the storage device 27 to the cache 26.

The switch 23, for example, is a crossbar switch, and is a device for interconnecting the CHA 21, DKA 24, shared memory 25, cache 26, and management I/F 22. Another type of connector, such as a bus, can be used in place of the switch 23.

The shared memory 25, for example, can be configured from either a nonvolatile or a volatile semiconductor memory.

The shared memory 25, for example, stores the various commands received from the business server 1 and the control information used to control the storage system 2. A command and control information can be redundantly stored by a plurality of shared memories 25.

The cache 26, for example, can be configured from either a volatile or a nonvolatile semiconductor memory. The cache 26 stores data received from the business server 1, and data read out from the storage device 27. Furthermore, the shared memory 25 and the cache 26 can be configured as respectively independent memories as in this embodiment, or can be configured from a single memory. When configured from a single memory, for example, one part of the memory is used as a cache area, and the other part of the same memory is used as a shared memory area.

Further, in the storage system 2, for example, one or more RAID groups 29 are configured from the plurality of storage devices 27. The RAID group 29, for example, provides a redundant storage mode, which is based on RAID 1 or RAID 5. An LU 28 is created via the allocation of one portion each of the respective storage areas of the plurality of storage devices 27 comprising the RAID group 29. The LU 28 is provided to the business server 1 from the storage system 2. Furthermore, in this embodiment, when the LU 28 is the LU 28, which is provided to the business server 1 (that is, the LU 28 that stores the data utilized by the business server 1 application), this LU 28 will be called the "data VOL 28". Further, when the LU 28 is the LU 28, which stores a journal, this LU 28 will be called the "journal VOL 28".

The management server 3 is a computer for managing the business server 1 and the storage system 2. The management server 3, for example, comprises a CPU 31, and a memory 32. The memory 32, for example, stores a management program 33, copy configuration management table 37, resource information management table 38, copy mode management table 39, and trend information 7. The management program 33, for example, comprises a resource information manager 34, copy mode manager 35, and copy mode changer 36 as sub-programs. The processing carried out by the management program 33 (resource information manager 34, copy mode manager 35, and copy mode changer 36), and the various tables and information (copy configuration management table 37, resource information management table 38, copy mode management table 39, and trend information 7) will be explained in detail hereinbelow.

FIG. 2 is a diagram illustrating an overview of a remote copy carried out by this system.

As shown in this figure, the local site 8 and the remote site 8 are interconnected in accordance with their respective first communication networks 4 being connected.

One unit for carrying out a remote copy (hereinafter "copy unit 6") is created from a prescribed data VOL 28 of the primary storage system 2, and a prescribed data VOL 28 of the secondary storage system 2. Of the data VOL 28, which create the copy unit 6, the data VOL 28 comprised in the primary storage system 2 becomes the PVOL, and the data VOL 28 comprised in the secondary storage system 2 becomes the SVOL. When a remote copy is started in the copy unit 6, the data stored in the PVOL is copied to the SVOL at a prescribed timing by way of the respective first communication networks 4 of the local site 8 and the remote site 8. Furthermore, as will be explained hereinbelow, when a journal asynchronous copy is used as the mode for realizing the remote copy, the PVOL data is not copied directly to the SVOL, but rather the data of a journal VOL 28 associated to the PVOL is copied to a journal VOL 28 associated to the SVOL. Then, a journal stored in the journal VOL 28 associated to the SVOL is used to update the data of the SVOL (the data content of the post-update SVOL becomes the same at the PVOL data content).

In this system, three modes are used as remote copy modes (copy modes) in explaining this embodiment, a mode called a "synchronous copy", a mode called a "cache asynchronous copy", and a mode called a "journal asynchronous copy". These three copy modes will be explained below by referring to FIGS. 3A through 3C.

FIG. 3A is a diagram showing an overview of a synchronous copy.

A "synchronous copy" is a copy mode, which synchronizes the PVOL and SVOL. When the synchronous copy is employed as the copy mode, the remote copy process is carried out as follows. That is, first, the primary storage system 2 writes the write-targeted data to the PVOL in accordance with the write request received from the business server 1 ((1) in the figure). Next, the primary storage system 2 transfers the write-targeted data written to the PVOL to the secondary storage system 2 ((2) in the figure). Then, the secondary storage system 2 writes the transferred write-targeted data to the SVOL. Furthermore, the above-mentioned PVOL and SVOL create the same copy unit (for example, a volume pair) 6. When the write to the SVOL is complete, the secondary storage system 2 notifies the primary storage system 2 to the effect that the write to the SVOL has ended ((3) in the figure). Thereafter, the primary storage system 2 notifies the business server 1 to the effect that the write for the write-targeted data has ended ((4) in the figure).

When the synchronous copy is employed, of the resources used to carry out the remote copy, for example, the resource for transferring the data over the first communication networks 4 connecting the primary storage system 2 and the secondary storage system 2 (hereinafter, the "network resource") is the main resource affecting the success or failure of the remote copy and the remote copy performance. For example, if the network resource is insufficient and network performance drops markedly (for example, if the transfer rate becomes conspicuously slow), the remote copy will take a long time, and in some cases, there is the danger that the remote copy will not be able to be carried out normally.

Figure 3B:
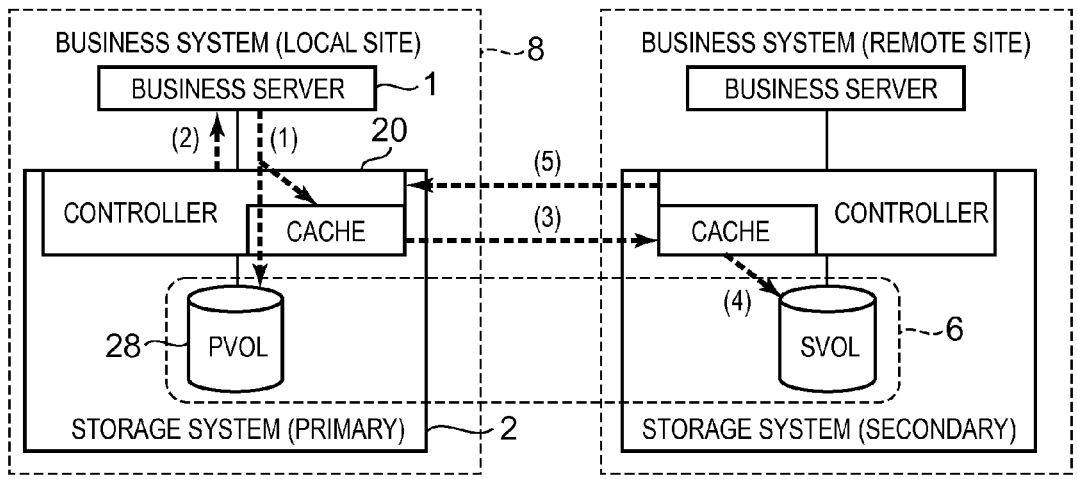
FIG. 3B is a diagram showing an overview of a cache asynchronous copy.

FIG. 3B is a diagram showing an overview of a cache asynchronous copy.

A "cache asynchronous copy" is the copy mode that uses the first cache 26 of the primary storage system 2 as a buffer. When the cache asynchronous copy is employed as the copy mode, the remote copy process is carried out as follows. That is, first, the primary storage system 2 writes the write-targeted data to the PVOL in accordance with the write request received from the business server 1 ((1) in the figure). Next, the primary storage system 2 notifies the business server 1 to the effect that the write for the write-targeted data has ended ((2) in the figure). In other words, the business server 1 is notified to the effect that the data write has ended at the point in time when the write-targeted data is written to the PVOL (regardless of whether or not this data has been written to the SVOL). The write-targeted data is buffered in the cache 26 at this point. Thereafter, the primary storage system 2 transfers the write-targeted data buffered in the cache 26 to the secondary storage system 2 at a prescribed timing ((3) in the figure). Then, the secondary storage system 2 buffers the transferred write-targeted data in the cache 26. Thereafter, the secondary storage system 2 writes the write-targeted data buffered in the cache 26 to the SVOL in the order in which it was written ((4) in the figure). When the write to the SVOL is complete, the secondary storage system 2 notifies the primary storage system 2 to the effect that the write to the SVOL has ended ((5) in the figure).

When the cache asynchronous copy is employed, of the resources used to carry out the remote copy, for example, the above-mentioned network resource, and the storage area capable of being used for the above-mentioned buffering to the caches 26 of the primary storage system 2 and the secondary storage system 2 (hereinafter, the "cache resource") are the main resources affecting the success or failure of the remote copy and the remote copy performance. For example, if the cache resource is insufficient (that is, if the residual capacity of the cache 26 (the size of the usable storage area) becomes low), and it is not possible to store the write-targeted data in the cache 26, there is the danger that the remote copy will not be able to be carried out normally.

Figure 3C:
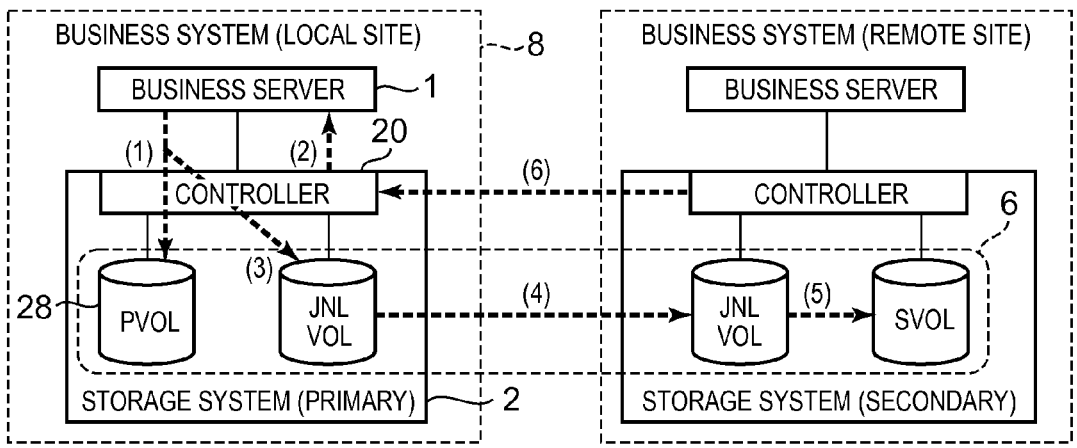
FIG. 3C is a diagram showing an overview of a journal asynchronous copy.

FIG. 3C is a diagram showing an overview of a journal asynchronous copy. Furthermore, the term "JNL VOL" in the figure stands for "journal VOL".

A "journal asynchronous copy" is the copy mode that uses a journal VOL of the primary storage system 2 as a buffer. When the journal asynchronous copy is employed as the copy mode, the remote copy process is carried out as follows. That is, first, the primary storage system 2 writes the write-targeted data to the PVOL in accordance with the write request received from the business server 1 ((1) in the figure). Next, the primary storage system 2 notifies the business server 1 to the effect that the write for the write-targeted data has ended ((2) in the figure). In other words, in this case, the business server 1 is notified to the effect that the data write has ended at the point in time when the write-targeted data is written to the PVOL the same as when a cache asynchronous copy is employed. The primary storage system 2 writes the write-targeted data to the journal VOL 28 associated to the PVOL as a journal ((3) in the figure). Thereafter, the primary storage system 2 transfers the journal written to the journal VOL 28 to the secondary storage system 2 at a prescribed timing ((4) in the figure). Then, the secondary storage system 2 writes the transferred journal to the journal VOL 28 associated to the SVOL. Thereafter, the secondary storage system 2 uses the journal stored in the journal VOL associated to the SVOL to update the data of the SVOL (the data content of the post-update SVOL becomes the same as the PVOL data content) ((5) in the figure). When the SVOL update is complete, the secondary storage system 2 notifies the primary storage system 2 to the effect that the write to the SVOL has ended ((6) in the figure).

When the journal asynchronous copy is employed, of the resources used to carry out the remote copy, for example, the above-mentioned network resource, and the storage areas capable of being used in the journal VOL 28 associated to the PVOL and SVOL (hereinafter, the "journal resource") are the main resources affecting the success or failure of the remote copy and the remote copy performance. For example, if the journal resource is insufficient (that is, if the residual capacity of the journal VOL 28 (the size of the usable storage area) becomes low), and it is not possible to store the write-targeted data (journal) in the journal VOL 28, there is the danger that the remote copy will not be able to be carried out normally. Furthermore, the journal stored in the journal VOL 28 can comprise not only the write-targeted data, but also management information (for example, information denoting when, where and in which PVOL the write-targeted data has been written), and the management information can also be stored in a different storage area than the journal VOL 28, such as the shared memory 25.

The three copy modes employed in this system have been explained hereinabove, and the type of resource, which is used to carry out a remote copy, and which affects the success or failure and performance of a remote copy like this (hereinafter, "target resource"), will differ for each copy mode (the network resource is common to all). In this embodiment, when the copy mode is the synchronous copy, the network resource is considered the target resource. Further, when the copy mode is the cache asynchronous copy, the network resource and the cache resource are considered the target resources. Furthermore, when the copy mode is the journal asynchronous copy, the network resource and the journal resource are considered the target resources. That is, in this embodiment, the types of target resources (hereinafter, "resource type") are considered to be three types: the network resource, the cache resource, and the journal resource. Hereinbelow, to avoid confusion when specifying the type of target resource, the target source names will be abbreviated as "network", "cache" and "journal", and notated in parentheses (When the target source names are not abbreviated and notated in parentheses, the term target resource alone will be specified.).

The management server 3 related to this embodiment is linked to the business server 1, and monitors the resource statuses of the target resources respectively used for each copy unit 6 created in this system. As used here, "resource status" refers to the status of a target resource at the time, such as the extent of the target resource. In this embodiment, to make the meaning of resource status more explicit, the resource status will be defined as follows. That is, if the target resource type is "network", the resource status will be defined as how much time it takes to transfer a fixed amount of data (hereinafter, the "data transfer time"), and when "cache" or "journal" is the target resource type, the resource status will be defined as the size of the residual capacity of the data area. The management server 3 can determine whether or not a sufficient target resource has been secured to enable a remote copy to be carried out normally by monitoring the resource status. Then, when the target resource is insufficient, or when it appears that the target resource is insufficient to enable a remote copy to be carried out normally, the management server 3 changes the copy mode of the copy unit 6 using this target resource. The criteria for changing a copy mode (the state in which a change is made, or the copy mode to which the change is made) will be explained hereinbelow, but ordinarily, the post-change copy mode is deemed a copy mode for which a sufficient target resource is available to enable the remote copy to be carried out normally.

Next, the various tables and information comprised in the management server 3 (the copy configuration management table 37, resource information management table 38, copy mode management table 39, and trend information 7) will be explained in detail by referring to FIGS. 4 through 9. Furthermore, in the tables of the respective figures, the assigned reference numerals specify the column or field, and do not specify the value, which is stored in the column or field. Therefore, in the explanation that follows, a reference numeral will be given when specifying a column or field, and the explanation will be presented without using a reference numeral when a column or field is not being specified.

FIG. 4 is a diagram showing an example of a copy configuration management table 37.

The copy configuration management table 37 is for managing information related to the configuration of the copy unit 6 created in this system. The copy configuration management table 37 stores for each copy unit 6, for example, a copy ID, copy mode, PVOL-related information (for example, a serial number, LDEV number, and business server 1 name), SVOL-related information (for example, a serial number, LDEV number, and business server 1 name), information showing the type of application, and link information to target-resource-related information. More specifically, the copy configuration management table 37, for example, comprises columns for a copy ID 371, copy mode 372, PVOL 373, SVOL 374, application 375, and resource 376.

Copy ID 371 is the column for storing a copy ID assigned to this copy unit 6. The copy ID is an identifier for uniquely specifying the copy unit 6.

Copy mode 372 is the column for storing information showing the copy mode that this copy unit 6 employs. For example, if the copy mode is synchronous copy, "synchronous" is configured in copy mode 372. Further, if the copy mode is cache asynchronous copy, "asynchronous C" is configured in copy mode 372, and if the copy mode is journal asynchronous copy, "asynchronous J" is configured in copy mode 372.

PVOL 373 is the column for storing information related to the PVOL in this copy unit 6. PVOL 373, for example, is configured from the columns SERIAL 3731, LDEV 3732, and HOST NAME 3733. The serial number of the storage system 2 that has the PVOL of this copy unit 6 is stored in SERIAL 3731. The LDEV number of the storage system 2 that has the PVOL of this copy unit 6 is stored in LDEV 3732. Information showing the business server 1 (for example, the name of the business server), which uses the PVOL of this copy unit 6, is stored in HOST NAME 3733.

SVOL 374 is the column for storing information related to the SVOL of this copy unit 6. SVOL 374, similar to PVOL 373, for example, is configured from the columns SERIAL 3741, LDEV 3742, and HOST NAME 3743. The serial number of the storage system 2 that has the SVOL of this copy unit 6 is stored in SERIAL 3741. The LDEV number of the storage system 2 that has the SVOL of this copy unit 6 is stored in LDEV 3742. Information showing the business server 1 (for example, the name of the business server 1), which uses the SVOL in this copy unit 6, is stored in HOST NAME 3743.

Application 375 is the column for storing information (hereinafter, "application type information") showing the type of application program (hereinafter, "application type") that accesses the data VOL 28, which makes up this copy unit 6. For example, if the application type is database management system (DBMS), "DBMS" is configured in application 375. Further, if the application type is a mail application (e-mail software), "Mail" is configured in application 375, and if the application type is a file system, "File System" is configured in application 375.

Resource 376 is the column for storing link information (information linking the copy unit 6 with resource information regarding the target resource that this copy unit 6 will use, for example, a resource ID, which will be explained hereinbelow) to the target-resource-related information (hereinafter, "resource information") used when this copy unit 6 carries out a remote copy. The resource information is information managed in the resource information management table 38 for each target-resource. In this embodiment, a resource ID is employed as the link information to the resource information. Resource information regaring the target-resource used by this copy unit 6 is obtained by referencing the resource information management table 38 using the resource ID as a keyword. When three types of resources— "network", "cache", and "journal"—are considered as in this embodiment, resource 376, for example, is configured from the three columns network 3761, cache 3762, and journal 3763. For example, when the copy unit 6 employs a synchronous copy, the resource ID assigned to the network resource used by this copy unit 6 is stored in network 3761. This is because the network resource is considered the target-resource in the case of a synchronous copy. Further, when the copy unit 6 employs a cache asynchronous copy, the resource ID assigned to the network resource used by this copy unit 6 is stored in network 3761, and the resource ID assigned to the cache resource used by this copy unit 6 is stored in cache 3762. This is because the network resource and the cache resource are considered the target-resources in the case of a cache asynchronous copy. Furthermore, when the copy unit 6 employs a journal asynchronous copy, the resource ID assigned to the network resource used by this copy unit 6 is stored in network 3761, and the resource ID assigned to the journal resource used by this copy unit 6 is stored in journal 3763. This is because the network resource and the journal resource are considered the target-resources in the case of a journal asynchronous copy. In the case of this figure, since the copy unit 6, which has the copy ID "C0001", employs a synchronous copy, the network resource is considered the target-resource. Therefore, the resource ID ("R0001") of the network resource used in this copy unit 6 is configured in the network 376 column of the copy unit 6 having the copy ID "C0001". Furthermore, the resource information comprising this "R0001" as the resource ID in the resource information management table 38 becomes resource information related to the target-resource (the network resource) used by the copy unit 6 having the copy ID "C0001". Further, since the copy unit 6, which has the copy ID "C0001", employs a synchronous copy, and only the network resource is considered to be the target-resource (or a target-resource other than the network resource is not utilized), a resource ID or other such link information is not configured in cache 3762 and journal 3763 (for example, a "–" is configured).

The information respectively configured in copy mode 372, PVOL 373, SVOL 374 and application 375 in the copy configuration management table 37 is information notified from the business server 1. The business server 1 acquires the information respectively configured in copy mode 372, PVOL 373, and SVOL 374 (hereinafter, "copy configuration information") from the storage system 2, and acquires the information configured in application 375 (application type information) from its own (this business server 1) memory 12. Then, the business server 1 notifies the management server 3 of this acquired information (the copy configuration information and application type information). The management server 3 configures the notified copy configuration information and application type information in columns corresponding to the copy configuration management table 37.

FIG. 5 is a diagram showing an example of a resource information management table 38.

The resource information management table 38 is for managing resource information related to the respective target-resources for each target-resource used by a copy unit 6 created in this system. Resource information, for example, comprises a resource ID, information showing the type of target-resource, information showing the scope of monitoring for a target-resource, and link information to trend information 7 (information, for example, a trend ID, which will be described hereinbelow, linking a target-resource with trend information 7 related to this target-resource). More specifically, the resource information management table 38, for example, comprises columns for a resource ID 381, type 382, scope 383, and a trend information link 384. Furthermore, even when a plurality of copy units 6 use the same target-resource in common, it is possible to record separate resource information for each target-resource used by the respective copy units 6 in the resource information management table 38.

Resource ID 381 is the column for storing the resource ID assigned to this target-resource. The resource ID is an identifier for uniquely specifying a target-resource (or resource information related to this target-resource).

Type 382 is the column for storing information showing the type of this target-resource. For example, if the resource type is "network resource", "network" is configured in type 382. Further, if the resource type is "cache resource", "cache" is configured in type 382, and if the resource type is "journal resource", "journal" is configured in type 382.

Scope 383 is the column for storing information related to the scope of monitoring of this target-resource. For example, if "pair" is configured in scope 383, the target-resource used by the copy unit 6 is monitored for each copy unit 6. Further, if "storage" is configured in scope 383, the target-resource jointly used by a plurality of copy units 6 comprised in a storage system 2 is monitored.

Trend information link 384 is the column for storing link information to trend information 7 related to the relevant target-resource. Trend information 7 shows a trend in the changes of the resource status related to the relevant target-resource. In this embodiment, a trend ID is employed as the link information to trend information 7. The trend ID is an identifier for uniquely specifying the trend information 7 created for each target-resource. The trend information 7 related to the relevant target-resource is obtained by using the trend ID as a keyword. Details concerning trend information 7 will be explained in FIGS. 6 through 8, but trend information 7 comprises a value showing the resource status (hereinafter, the "resource status value"), and the time at which this resource status value was acquired.

FIGS. 6 through 8 are diagrams showing examples of trend information 7. Trend information 7, as explained hereinabove, is information showing the trend of changes in the resource status related to the target-resource. The creation or updating of trend information 7 is carried out by the business server 1 and management server 3 working together. That is, the business server 1, either regularly or irregularly, monitors this resource status for each of the target-resources used by a copy unit 6 created in this system. Then, the business server 1 notifies the results of this monitoring (the resource status value and the time at which this resource status value was acquired) to the management server 3. Upon receiving the notification of the monitoring results, the management server 3 either generates new trend information 7 comprising the monitoring results, or updates the trend information 7 by adding the monitoring results to the existing trend information 7. The resource status value comprised in the trend information 7 differs for each resource type. Hereinafter, the trend information 7 respectively related to each of the three types of target-resources (the network resource, cache resource, and journal resource) considered in this embodiment will be explained individually.

FIG. 6 is a diagram showing an example of trend information 7A related to the network resource.

Field 70 of the trend information 7A comprises the trend ID and the resource type. This trend ID becomes the link information configured in trend information 384 in the resource information management table 38. Therefore, for example, since the trend information 7A of FIG. 6 comprises trend ID "T0001", it is clear that this trend information 7A is the trend information 7 related to the target-resource of resource ID "R0001" in the resource information management table 38 of FIG. 5.

The trend information 7A comprises a resource status value for a certain time, and a warning threshold overrun record for each time. In other words, the trend information 7A comprises one or more combinations of a time, resource status value, and warning threshold overrun record. More specifically, in addition to field 70, the trend information 7A, for example, comprises fields for a time 71, resource status 72, and warning threshold overrun record 73. In this figure, the three fields lined up horizontally (the information stored in the respective fields) constitute one combination. Time 71 is the field for storing the time. Resource status 72 is the field for storing the resource status value of the target-resource associated to this trend information 7A for this time. The resource status value, that is, the data transfer time of the target-resource (network resource) associated to this trend information 7A is configured in the resource status 72 of the trend information 7A related to the network resource. The warning threshold overrun record 73 is the field for storing the warning threshold overrun record for the relevant time. The warning threshold overrun record is information showing whether or not the resource status value exceeds a warning threshold, which will be explained hereinbelow. For example, when the resource status value exceeds the warning threshold, a "1" is configured in the warning threshold overrun record 73, and when the resource status value does not exceed the warning threshold, a "0" is configured in the warning threshold overrun record 73.

FIG. 7 is a diagram showing an example of trend information 7B related to the cache resource.

With the exception of the resource status value stored in resource status 72, this trend information 7B is substantially the same as the trend information 7A related to the network resource. The resource status value of the target-resource (the cache resource) associated to this trend information 7B, that is, the amount of residual capacity in this cache 26, is configured in the resource status 72 of the trend information 7B related to the cache resource. Furthermore, because the trend information 7B of FIG. 7 comprises trend ID "T0002", it is clear that this trend information 7B is the trend information 7 related to the target-resource of resource ID "R0002" in the resource information management table 38 of FIG. 5.

FIG. 8 is a diagram showing an example of trend information 7C related to the journal resource.

With the exception of the resource status value stored in resource status 72, this trend information 7C is substantially the same as the trend information 7A related to the network resource, and the trend information 7B related to the cache resource. The resource status value of the target-resource (the journal resource) associated to this trend information 7C, that is, the amount of residual capacity in this journal VOL 28, is configured in the resource status 72 of the trend information 7C related to the journal resource. Furthermore, because the trend information 7C of FIG. 8 comprises trend ID "T0003", it is clear that this trend information 7C is the trend information 7 related to the target-resource of resource ID "R0003" in the resource information management table 38 of FIG. 5.

FIG. 9 is a diagram showing an example of the copy mode management table 39.

The copy mode management table 39 is for managing information (the copy mode currently being employed, and the criteria for changing the copy mode) related to changing the copy modes respectively employed in each copy unit 6 created in this system. The same copy units 6 are registered in both the copy mode management table 39 and the copy configuration management table 37. The copy mode management table 39, for example, comprises columns for a copy ID 391, copy mode 392, previous copy mode 393, previous change time 394, previous determination time 395, number-of-overruns count start time 396, warning threshold 397, danger threshold 398, number of overruns 399, overrun limit 390, preferred asynchronous 39A, trend estimate 39B, automatic resource expansion 39C.

Copy ID 391 is the column for storing the copy ID assigned to the relevant copy unit 6, the same as the copy ID 371 in the copy configuration management table 37. Copy mode 392 is the column for storing information showing the copy mode (copy mode currently being employed) being employed by the relevant copy unit 6, the same as the copy mode 372 in the copy configuration management table 37. Previous copy mode 393 is the column for storing information showing the copy mode, which the relevant copy unit 6 employed immediately prior to changing to the current copy mode (that is, the copy mode configured in copy mode 392). Previous change time 394 is the column for storing the time when the copy mode employed by the relevant copy unit 6 was changed to the current copy mode. Previous determination time 395 is the column for storing the time (most recent) when the process (hereinafter, "copy mode change determination process"), which determines whether or not a copy mode change will be carried out for the relevant copy unit 6, was carried out. The number-of-overruns count start time 396 is the column for storing the time at which the number of overruns configured in number of overruns 399 was initialized for the relevant copy unit 6.

The warning threshold 397 is the column for storing the warning threshold configured in the relevant copy unit 6. The warning threshold, for example, is a prescribed threshold related to the resource status value of the target resource indicating that a copy mode change should probably be considered. The information stored in the warning threshold overrun record 73 for trend information 7 is decided based on this warning threshold. That is, when the resource status value comprised in the trend information 7 exceeds the corresponding warning threshold, information (for example, a "1"), which shows that the warning threshold has been exceeded, is configured in the warning threshold overrun record 73, which constitutes a pair with the resource status 72 in which the resource status value is configured. Furthermore, in this embodiment, when the resource status value exceeds the warning threshold (or the danger threshold, which will be explained hereinbelow), this signifies that the resource status value is above the warning threshold if the resource type is "network", and signifies that the resource status value is below the warning threshold if the resource type is "cache" or "journal". This is because, in this embodiment, if the resource type is "network", the data transfer time becomes the resource status value. And if the resource type is "cache" or "journal", the residual capacity of the data area becomes the resource status value. In the example of FIG. 9, the warning threshold of the copy unit 6, which is copy ID "C0002", is 100 MB (Furthermore, this warning threshold is related to the cache resource.) Further, the cache resource of resource ID "R0002" is the target resource used by this copy unit 6 (refer to FIG. 4), and the trend information 7 related to this cache resource is the trend information 7B of FIG. 7 (refer to FIG. 5). Therefore, in the trend information 7B of FIG. 7, the resource status value ("80 (MB)") of time "2007/04/23 01:02:03" exceeds the warning threshold (100 (MB)"). Therefore, information ("1") showing that the resource status value exceeds the warning threshold is configured in the warning threshold overrun record 73 of time "2007/04/23 01:02:03". Furthermore, for the sake of conserving paper, only one warning threshold is shown in FIG. 9, but a warning threshold can be configured in warning threshold 397 for each resource type (That is, a warning threshold related to each of the three types of target-resources (network resource, cache resource, and journal resource) can be configured.). This is because, when the copy mode employed by the copy unit 6 changes, the resource type of the target-resource used by this copy unit 6 also changes pursuant thereto.

The danger threshold 398 is the column for storing a danger threshold configured in the relevant copy unit 6. As used here, the danger threshold, for example, is a prescribed threshold related to the resource status value of the target resource indicating that the copy mode must be changed. That is, the danger threshold is a threshold in which there is configured a value of a higher degree of danger than the warning threshold (high likelihood that the remote copy will not be carried out normally). If the resource type is "network", the danger threshold is a value that is larger than the warning threshold. Further, if the resource type is "cache" or "journal", the danger threshold is a value that is smaller than the warning threshold. Furthermore, a danger threshold can be configured in danger threshold 398 for each resource type, the same as for the warning threshold.

Number of overruns 399 is the column for storing the number of times the target-resource (the resource status value thereof) used by the relevant copy unit 6 exceeds the warning threshold (hereinafter, "number of overruns"). Overrun limit 390 is the column for storing the upper limit value for the number of overruns (hereinafter, "overrun limit"). When the number of overruns exceeds the overrun limit, either a process for changing the copy mode (hereinafter, "copy mode change process") or a process for expanding the target-resource (a target-resource other than "network") (hereinafter "resource expansion process") is carried out. That is, for the danger threshold, when the resource status value exceeds the danger threshold, either a copy mode change process or a resource expansion process is carried out, and for the warning threshold, when the number of warning threshold overruns exceeds the overrun limit, either a copy mode change process or a resource expansion process is carried out.

Preferred asynchronous 39A is the column for storing information showing the criteria for deciding a post-change copy mode when changing a synchronous copy to another copy mode (a cache asynchronous copy or a journal asynchronous copy). For example, "residual capacity preferred", "asynchronous C preferred", "asynchronous J preferred" or "previous configuration preferred" can be configured in preferred asynchronous 39A. When "residual capacity preferred" is configured in preferred asynchronous 39A, the percentage of residual capacity in the cache 26 is compared against the percentage of residual capacity in the journal VOL 28, and the copy mode, which uses the target-resource with the largest percentage of residual capacity, is decided as the post-change copy mode. That is, when the percentage of residual capacity in the cache 26 is larger, a cache asynchronous copy is decided as the post-change copy mode. By contrast, when the percentage of residual capacity in the journal VOL 28 is larger, a journal asynchronous copy is decided as the post-change copy mode. Further, when "asynchronous C preferred" is configured in preferred asynchronous 39A, the cache asynchronous copy is preferentially decided as the post-change copy mode. Similarly, when "asynchronous J preferred" is configured in preferred asynchronous 39A, the journal asynchronous copy is preferentially decided as the post-change copy mode. Furthermore, when "previous configuration preferred" is configured in preferred asynchronous 39A, the copy mode, which was employed the previous time (the copy mode configured in copy mode 393 the previous time) is decided as the post-change copy mode.

Trend estimate 39B is the column for storing information showing whether or not to use a trend estimate function. As used here, a trend estimate function is a function that estimates from the trend information 7 the time when resource insufficiency is likely to occur, and carries out a copy mode change process before this time arrives. If "valid" is configured in trend estimate 39B, the trend estimate function is used, and if "invalid" is configured in trend estimate 39B, the trend estimate function is not used.

Automatic resource expansion 39C is the column for storing information showing whether or not a resource expansion process will be carried out when the target-resource (resource status value thereof) used by the relevant copy unit 6 exceeds the danger threshold, or when the number of overruns exceeds the overrun limit. If "valid" is configured in automatic resource expansion 39C, the resource expansion process is carried out, and if "invalid" is configured in automatic resource expansion 39C, the resource expansion process is not carried out. Furthermore, when the copy mode is the synchronous mode, the value configured in automatic resource expansion 39C will be considered invalid (ordinarily, for example, a "–" is configured).

The preceding is an explanation of the constitution of this system. The various processing flows carried out in this system will be explained below. Furthermore, the following respective flowcharts show overviews of the respective processes to the extent necessary to understand and implement the present invention. Therefore, a so-called person with ordinary skill in the art will be able to change the order of the steps, and/or change a step to a different step without departing from the scope of the present invention.

FIG. 10 is a flowchart of the process by which the management program 33 creates a copy configuration management table 37, a resource information management table 38, and trend information 7.

This process is carried out by the management program 33 of the management server 3 working together with the monitoring program 13 of the business server 1. The management program 33 of the management server 3 creates a copy configuration management table 37, a resource information management table 38, and trend information 7 based on information notified from the monitoring program 13 of the business server 1. The specific processing flow is described below.

The business server 1 monitoring program 13 (resource information acquisition unit 14) first respectively acquires copy configuration information from the storage system 2, and application type information from the memory 12 of the business server 1 (S101). As described hereinabove, the copy configuration information is information respectively configured in the copy mode 372, PVOL 373, and SVOL 374 columns of the copy configuration management table 37. More specifically, for example, the monitoring program 13 sends a command to the storage system 2 to acquire information related to the copy unit 6 created in this storage system 2 (information related to the copy mode employed by this copy unit 6, and information related to the PVOL and SVOL of this copy unit 6). The monitoring program 13 can receive the copy configuration information from the storage system 2 in response to this command. Then, the monitoring program 13 acquires from memory 12 information (application type information) showing the type of application, which will access the PVOL that forms this copy unit 6, for each copy unit 6 comprised in the copy management information acquired from the storage system 2. Furthermore, the monitoring program 13 stores the copy configuration information acquired from the storage system 2 in the memory 12 comprised in the business server 1. This is because the monitoring program 13 can determine which target-resource resource status value should be acquired by referring to this copy configuration information when acquiring a resource status value in subsequent processing.

Next, the business server 1 monitoring program 13 sends the acquired copy configuration information and application type information to the management program 33 of the management server 3 (S102).

The management server 3 management program 33 that receives the copy configuration information and application type information creates a copy configuration management table 37 and a resource information management table 38 (S103). More specifically, the management program 33 creates a copy configuration management table 37 by configuring the received copy configuration information and application type information in the corresponding columns of the copy configuration management table 37. Furthermore, the information stored in resource 376 is decided based on the copy mode of the relevant copy unit 6. For example, if the copy mode is the synchronous mode, since the resource type of the target-resource is "network", the resource ID arbitrarily assigned to this target-resource is configured in network 3761. Then, the management program 33 creates a resource information management table 38, which registers resource information respectively related to all the target-resources configured in the resource 376 column of the copy configuration management table 37. Furthermore, at this point in time, trend information 7 related to the target-resource has yet to be created.

Thereafter, the business server 1 monitoring program 13 acquires the resource status values for each of the target-resources used by the copy unit 6 comprised in the copy configuration information (stored in the memory 12) acquired in S101 (S104). As described hereinabove, the resource status value is data transfer time when the resource type of the target-resource is "network", is cache 26 residual capacity when the resource type of the target-resource is "cache", and is journal VOL 28 residual capacity when the resource type of the target-resource is "journal". Therefore, when the target-resource is the network resource, the monitoring program 13 measures the data transfer time between the primary storage system 2 and the secondary storage system 2, which form the target copy unit 6, and use this measurement result as the resource status value of this target-resource (network resource). Further, when the target-resource is the cache resource, the monitoring program 13 acquires the residual capacity of the cache 26 comprised in the storage system 2 from the storage system 2 having the PVOL, which forms the target copy unit 6. Then, the monitoring program 13 uses the acquired value as the resource status value of this target-resource (cache resource). Furthermore, when the target-resource is the journal resource, the monitoring program 13 acquires the residual capacity of the journal VOL 28 associated to the PVOL from the storage system 2 having the PVOL, which forms the target copy unit 6. Then, the monitoring program 13 uses the acquired value as the resource status value of this target-resource (journal resource).

Thereafter, the monitoring program 13 of the business server 1 sends the resource status value acquired in S104, and the time at which this resource status value was acquired to the management program 33 of the management server 3 (S105). Furthermore, the monitoring program 13 also sends information, which is associated to the resource status value, and which shows the copy unit 6 using the target-resource that obtained this resource status value (for example, the copy ID managed in common by the management server 3). This is because the management program 33 is constituted so as to be able to determine the corresponding relationship between the trend information 7 comprising the resource status value, and the copy unit 6 (target-resource used by the copy unit 6).

Thereafter, the business server 1 monitoring program 13, after standing by for a fixed time (S106), carries out S104. That is, the processing of S104 through S106 is repeated.

Meanwhile, the management server 3 management program 33, which receives the resource status value and time, either creates trend information 7 or carries out updating (S107). More specifically, when the trend information 7 has yet to be created, the management program 33 creates new trend information 7 comprising the combination of received resource status value and time. Furthermore, this newly created trend information 7 is made correspondent to the copy unit 6 (target-resource used by the copy unit 6) specified by the information showing the copy unit 6 received together with the resource status value. Conversely, when the trend information 7 has already been created, the management program 33 adds the received resource status value and time combination to the corresponding existing trend information 7. Furthermore, the corresponding existing trend information 7 constitutes the trend information 7 associated to the copy unit 6 (target-resource used by the copy unit 6) specified by the information showing the copy unit 6 received together with the resource status value.

Figure 11:
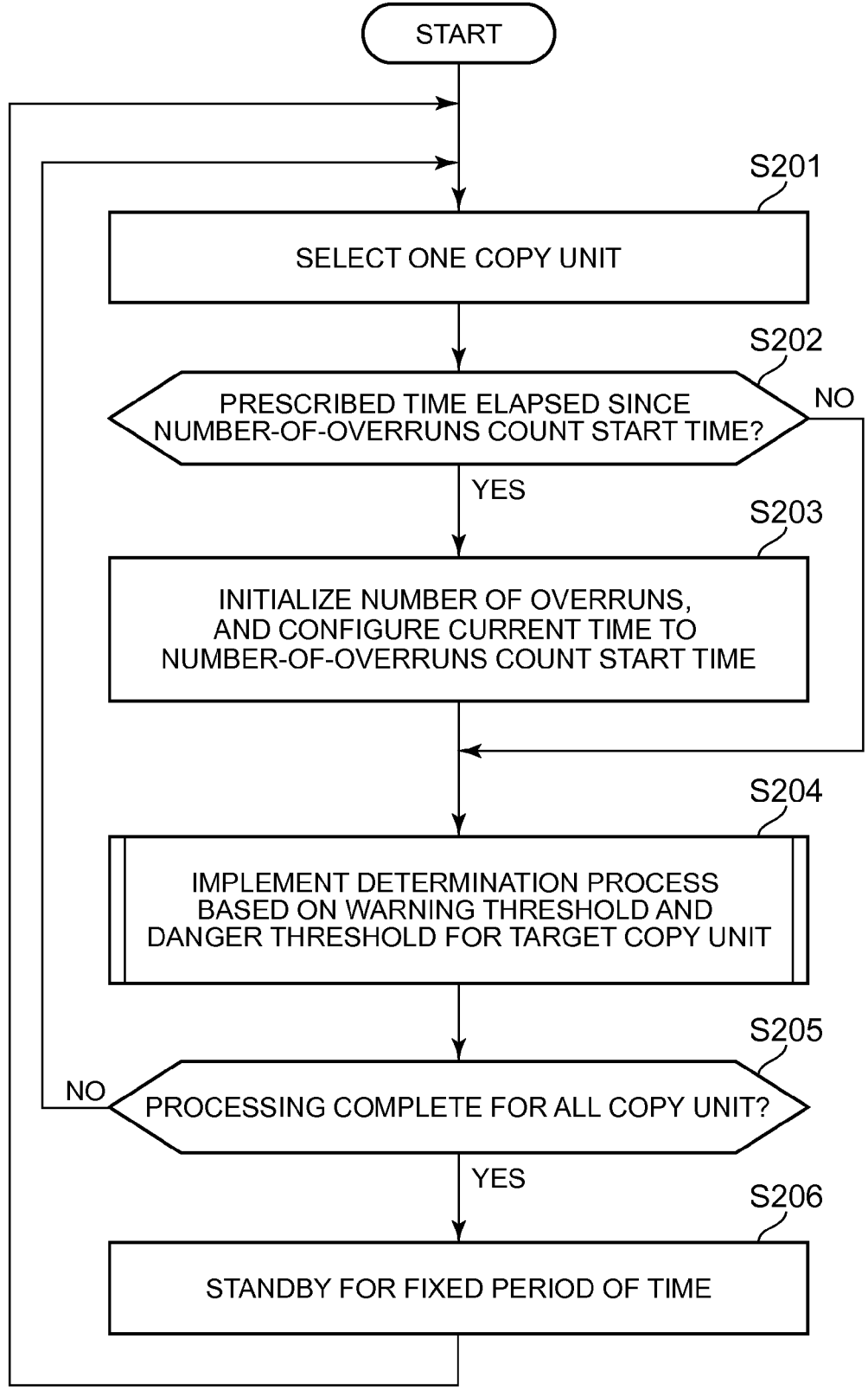
FIG. 11 is a flowchart of a copy mode change determination process.

FIG. 11 is a flowchart of the process for determining whether or not to carry out a copy mode change (copy mode change determination process).

This process is carried out by the management server 3 management program 33 (resource status manager 34). The management program 33, either regularly or irregularly, monitors the resource status of the target-resource used by the copy unit 6 registered in the copy configuration management table 37. Then, when the target-resource is insufficient, or is apparently insufficient to the extent that a remote copy cannot be carried out normally, the management program 33 either changes the copy mode of the copy unit 6, which is using this target-resource, or expands the target-resource. The specific processing flow is as follows.

First, the management server 3 management program 33 (resource status manager 34) references the copy configuration management table 37, and selects one of the copy units 6 registered in this table 37 (S201). Hereinafter, the copy unit 6 selected in this S201 will be referred to as the "target copy unit 6".

Next, the management program 33 references the copy mode management table 39, and determines whether or not a prescribed period of time has elapsed since the time (the number-of-overruns initialization time) configured in the number-of-overruns count start time 386 of the target copy unit 6 (S202).

When a prescribed period of time has elapsed since the number-of-overruns initialization time (S202: YES), the management program 33 initializes the number of overruns (configures number of overruns 399 to "0"). Then, the management program 33 configures the current time in the number-of-overruns count start time 386 column (S203).

Conversely, when the prescribed period of time has not elapsed since the number-of-overruns initialization time (S202: NO), S204 is carried out.

In S204, a specific determination process, which is based on the warning threshold and the danger threshold, is carried out for the target copy unit 6. The details of this process will be explained hereinbelow by referring to FIG. 12.

Thereafter, the management program 33 determines whether or not the processing of S201 through S204 has been implemented for all the copy units 6 registered in the copy configuration management table 37 (S205).

When processing for all the copy units 6 registered in the copy configuration management table 37 has not ended (S205: NO), S201 is carried out.

Conversely, when processing for all the copy units 6 registered in the copy configuration management table 37 has ended (S205: YES), the management program 33, subsequent to standing by for a fixed period of time (S206), carries out S201. That is, the processing of S201 through S206 is repeated.

Figure 12:
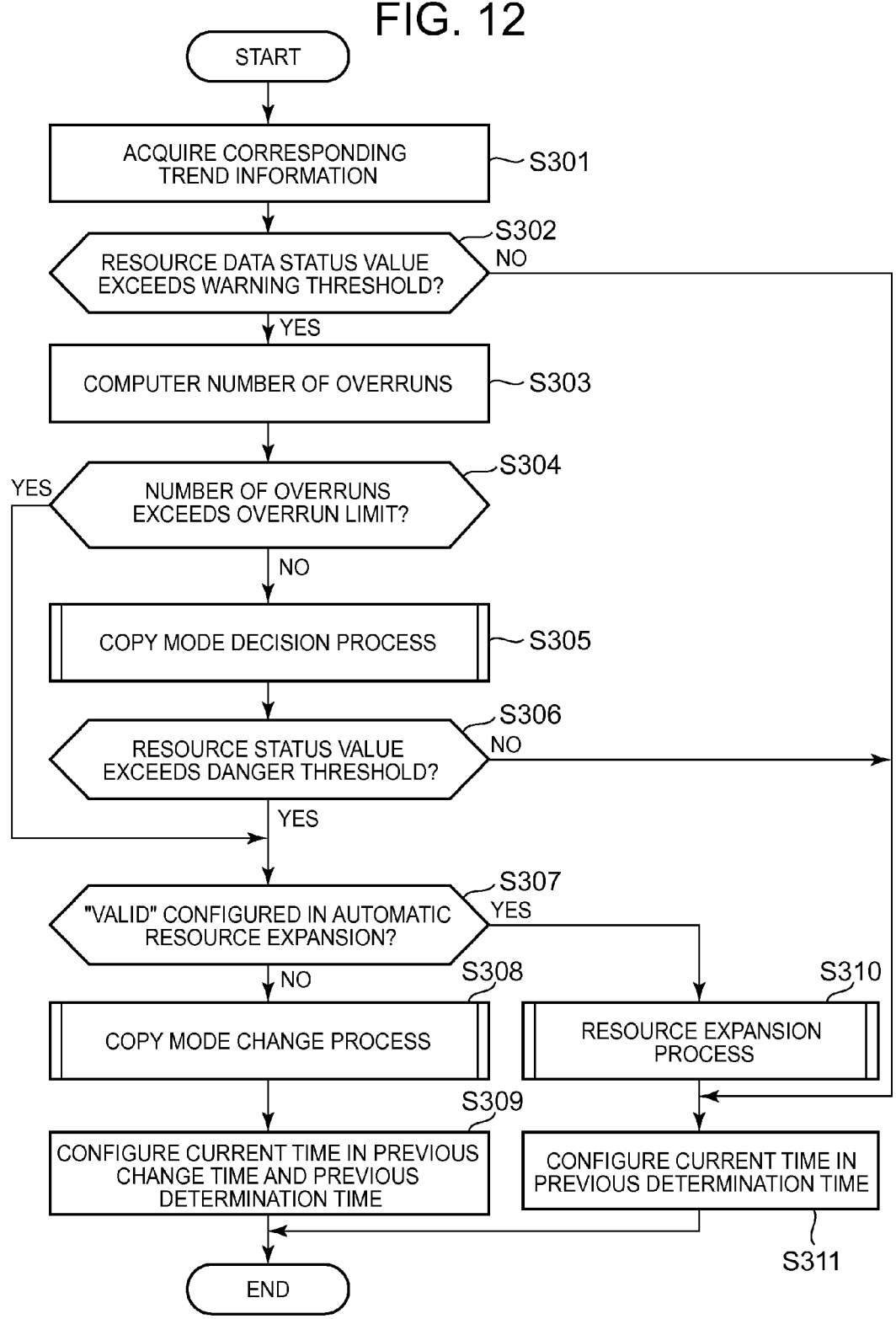
FIG. 12 is a flowchart of a specific determination process based on a warning threshold and a danger threshold in a copy mode change determination process.

FIG. 12 is a flowchart of a specific determination process, which is based on the warning threshold and the danger threshold, in the copy mode change determination process.

This process is equivalent to the processing of S204 in FIG. 11. Whether or not the target-resource used by the target copy unit 6 is so insufficient (or whether or not this target-resource is apparently so insufficient) that a remote copy cannot be carried out normally is determined in accordance with this process being carried out. Then, when the target-resource is so insufficient (or apparently so insufficient) that a remote copy cannot be carried out normally, either the copy mode of the copy unit 6 that utilizes this target-resource is changed, or the target-resource is expanded.

First of all, the management server 3 management program 33 (resource status manager 34) acquires the trend information 7 corresponding to the target copy unit 6 (S301). The trend information 7 corresponding to the target copy unit 6 here is the trend information 7 related to the target-resource used by the target copy unit 6. For example, in the copy configuration management table 37 of FIG. 4, the copy unit 6 of copy ID "C0003" uses the target-resource of resource ID "R0003" (the journal resource). Therefore, in the resource information management table 38 of FIG. 5, the trend information of the target-resource of resource ID "R0003" (the trend information 7C of FIG. 8, for which the trend ID is "T0003") constitutes the trend information 7 of the copy unit 6, for which the copy ID is "C0003". Furthermore, the copy unit 6 of copy ID "C0003" also uses the target-resource of resource ID "R0005" (the network resource). When there is a plurality of target-resources being used like this, the network resource is not taken into account in this embodiment. This is because, since the network resource is also utilized in the other copy modes, there is no changing from a cache asynchronous copy or journal asynchronous copy to another copy mode in the event the network resource has a resource insufficiency.

Next, the management program 33 references the trend information 7 acquired in S301 and the copy mode management table 39, and determines whether or not a resource status value, which exceeds the warning threshold configured in the target copy unit 6, is comprised in the trend information 7 (S302). For example, when the target copy unit 6 is the copy unit 6 of copy ID "C0003", the value ("1.00 (GB)") configured in the warning threshold 397 for this copy unit 6 in FIG. 9 constitutes the warning threshold configured for the target copy unit 6. The management program 33 can make all the resource status values configured in the trend information 7 the target of the determination, or the management program 33 can make the resource status values for other than the time configured in the previous determination time 395 column of the copy mode management table 39 the target of the determination.

When a resource status value that exceeds the warning threshold is not comprised in the trend information 7 (S302:

NO), S311 is carried out. That is, in this case, it is decided that there is no need to carry out a copy mode change or target-resource expansion.

Conversely, when a resource status value that exceeds the warning threshold is comprised in the trend information 7 (S302: YES), the management program 33 computes how many resource status values exceeding the warning threshold are comprised in the trend information 7 (S303). For this computation as well, the management program 33 can make all the resource status values comprised in the trend information 7 the target of the computation, or the management program 33 can make the resource status values for other than the time configured in the previous determination time 395 column of the copy mode management table 39 the target of the computation, the same as the case of the determination of S302. The computation result (the number of resource status values that exceed the warning threshold, that is, the number of overruns) is configured in the number of overruns 399 of the target copy unit 6 in the copy mode management table 39. Furthermore, when a resource status value of after the time configured in previous determination time 395 is used as the target of the computation, the value, which is configured in number of overruns 399 at the current point in time, is added to the above-mentioned computation result, and the post-addition value is configured in number of overruns 399.

Next, the management program 33 determines whether or not the number of overruns configured in number of overruns 399 in S303 exceeds the overrun limit of the target copy unit 6 (the value configured in overrun limit 390) (S304). Furthermore, when this determination is first carried out, the determination will always be "NO" (the overrun limit is configured such that "NO" is determined when this determination is first carried out).

When the number of overruns exceeds the overrun limit (S304: YES), S307 is carried out. That is, in this case, it is decided that there is a need to carry out a copy mode change or a target-resource expansion.

Conversely, when the number of overruns does not exceed the overrun limit (S304: NO), the management program 33 carries out a process to decide the post-change copy mode (hereinafter, "copy mode decision process") (S305). Carrying out a copy mode decision process at a point in time when the number of overruns still does not exceed the overrun limit like this makes it possible for the management program 33 to rapidly carry out a copy mode change process when a copy mode change actually becomes necessary. Furthermore, the copy mode decision process does not necessarily have to be carried out beforehand, but rather can be carried out when a copy mode change is needed, that is, immediately prior to S308. The copy mode decision process will differ for each pre-change copy mode (that is, the copy mode that the target copy unit 6 is currently employing). Information showing the post-change copy mode decided by the copy mode decision process is stored in the memory 32. The details of this processing will be explained hereinbelow by referring to FIGS. 13 through 15.

Thereafter, the management program 33 references the trend information 7 acquired in S301 and the copy mode management table 39, and determines whether or not a resource status value that exceeds the danger threshold is comprised in the trend information 7 (S306). This determination is substantially the same as the determination made in S302 (The warning threshold is simply replaced by the danger threshold.).

When the trend information 7 does not comprise a resource status value that exceeds the danger threshold (S306: NO), S311 is carried out. That is, in this case, it is decided that there is no need to carry out a copy mode change or target-resource expansion.

Conversely, when the trend information 7 comprises a resource status value that exceeds the danger threshold (S306: YES), the management program 33 references the copy mode management table 39, and determines whether or not "valid" is configured in automatic resource expansion 39C for the target copy unit 6 (S307).

When "valid" is not configured in automatic resource expansion 39C (S307: NO), the management program 33 carries out a copy mode change process, and changes the copy mode of the target copy unit 6 to the post-change copy mode decided in S305 (information showing the post-change copy mode is stored in the memory 32) (S308). The details of this processing will be explained hereinbelow by referring to FIG. 16.

Thereafter, the management program 33 respectively configures the current time in previous change time 394 and previous determination time 395 for the target copy unit 6 in the copy mode management table 39 (S309).

Conversely, when "valid" is configured in automatic resource expansion 39C (S306: YES), the management program 33 carries out a resource expansion process, and expands the target-resource used by the target copy unit 6 (the target-resource, which is the target of the processing of FIG. 12) (S310). The details of this processing will be explained hereinbelow by referring to FIG. 17.

Thereafter, the management program 33 configures the current time in previous determination time 395 of the target copy unit 6 in the copy mode management table 39 (S311).

Figure 13:
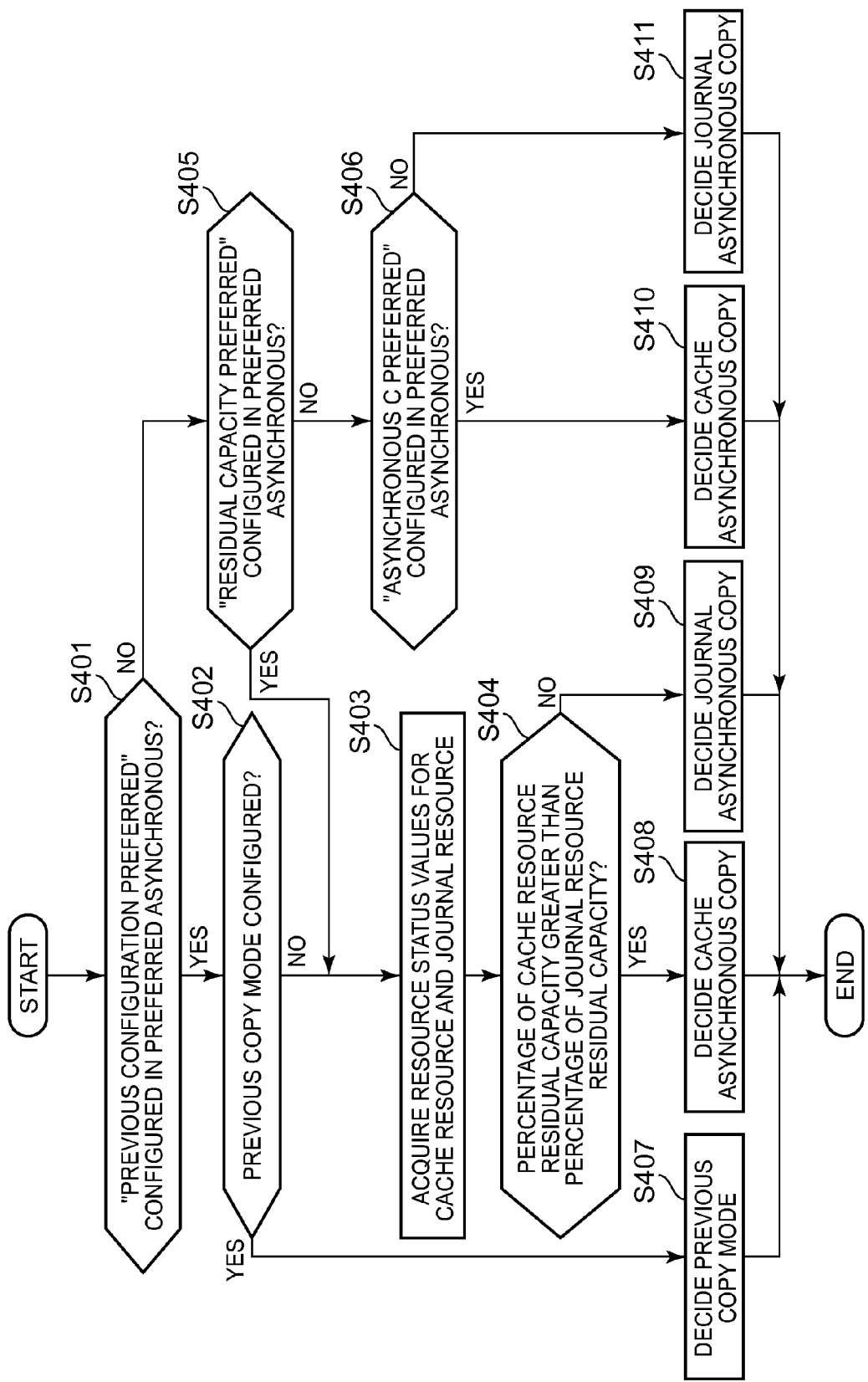
FIG. 13 is a flowchart of a copy mode decision process when the pre-change copy mode is a synchronous copy.

FIG. 13 is a flowchart of the copy mode decision process when the pre-change copy mode is synchronous copy.

This process is equivalent to the processing of S305 in FIG. 12. Carrying out this process decides the post-change copy mode when the pre-change copy mode is synchronous copy.

First, the management server 3 management program 33 (copy mode manager 35) references the copy mode management table 39, and determines whether or not "previous configuration preferred" is configured in preferred asynchronous 39A of the target copy unit 6 (S401).

When "previous configuration preferred" is not configured in preferred asynchronous 39A (S401: NO), S405 is carried out.

Conversely, when "previous configuration preferred" is configured in preferred asynchronous 39A (S401: YES), the management program 33 references the copy mode management program 39, and determines whether or not any of the copy modes is configured in previous copy mode 393 of the target copy unit 6 (S402).

When a copy mode is configured in previous copy mode 393 (S402: YES), the management program 33 decides the copy mode configured in this previous copy mode 393 to be the post-change copy mode (S407).

Conversely, when a copy mode is not configured in previous copy mode 393 (S402: NO), S403 is carried out.

In S405, the management program 33 references the copy mode management table 39, and determines whether or not "residual capacity preferred" is configured in preferred asynchronous 39A of the target copy unit 6.

When "residual capacity preferred" is configured in preferred asynchronous 39A (S405: YES), S403 is carried out.

Conversely, when "residual capacity preferred" is not configured in preferred asynchronous 39A (S405: NO), S406 is carried out.

In S403, the management program 33 acquires the resource status value of the target-resource (hereinafter, "post-changeuse resource"), which will be used when the copy mode is changed. The post-change-use resource here comprises the cache resource (hereinafter, "post-change-use cache resource"), which is to be used when the copy mode is changed to the cache asynchronous copy, and the journal resource (hereinafter, "post-change-use journal resource"), which is to be used when the copy mode is changed to the journal asynchronous copy. For example, the post-change-use cache resource is a usable storage area in the cache 26 comprised in the storage system 2 having the PVOL, which forms the target copy unit 6. Further, the post-change-use journal resource is a usable storage area in the journal VOL associated to the PVOL, which forms the target copy unit 6, or in the LU (journal VOL) 28, which is expected to be associated to this PVOL thereafter. The management program 33 acquires the respective resource status values of the post-change-use cache resource and the post-change-use journal resource. More specifically, when the trend information 7 related to the post-change-use resource is stored in the management server 3, the management program 33 acquires the resource status value of the current time, or the time nearest the current time, comprised in this trend information 7. Conversely, when the trend information 7 related to the post-change-use resource is not stored in the management server 3, the management program 33 acquires the resource status value of the post-change-use resource via the business server 1. That is, the management program 33 requests that the monitoring program 13 of the business server 1 acquire the resource status value of the post-change-use resource. The business server 1 monitoring program 13 that receives the request acquires the resource status value of the specified post-change-use resource using the same processing as S104 of FIG. 10, and sends this to the management server 3 management program 33. Furthermore, in FIG. 13, the post-change-use cache resource is notated simply as "cache", and the post-change-use journal resource is notated simply as "journal" (the same holds true for FIGS. 14 and 15).

Thereafter, the management program 33 carries out a size comparison of the percentage of residual capacity in the post-change-use cache resource against the percentage of the residual capacity in the post-change-use journal resource (S404). More specifically, the management program 33 computes the percentage of residual capacity in the post-change-use cache resource based on the resource status value (residual capacity of the cache 26) of the post-change-use cache resource acquired in S403 and the overall capacity of this post-change-use cache resource. Further, the management program 33 computes the percentage of residual capacity in the post-change-use journal resource based on the resource status value (residual capacity of the journal VOL 28) of the post-change-use journal resource acquired in S403 and the overall capacity of this post-change-use journal resource. Then, the management program 33 compares the size of the percentage of the residual capacity of the post-change-use cache resource against the size of the percentage of the residual capacity of the post-change-use journal resource, which were obtained via the above-described computation. Furthermore, the overall capacities of the post-change-use cache resource and post-change-use journal resource can be managed beforehand by the management server 3, or the management server 3 can acquire these overall capacities from the storage system 2 together with the resource status values in the processing of S403.

When the percentage of residual capacity of the post-change-use cache resource is greater than the percentage of residual capacity of the post-change-use journal resource (S404: YES), the management program 33 decides that the cache asynchronous copy will be the post-change copy mode (S408).

Conversely, when the percentage of residual capacity of the post-change-use cache resource is less than the percentage of residual capacity of the post-change-use journal resource (S404: NO), the management program 33 decides that the journal asynchronous copy will be the post-change copy mode (S409).

In S406, the management program 33 references the copy mode management table 39, and determines whether or not "asynchronous C preferred" is configured in preferred asynchronous 39A of the target copy unit 6.

When "asynchronous C preferred" is configured in preferred asynchronous 39A (S406: YES), the management program 33 decides that the cache asynchronous copy will be the post-change copy mode (S410).

Conversely, when "asynchronous C preferred" is not configured in preferred asynchronous 39A (S406: NO), the management program 33 decides that the journal asynchronous copy will be the post-change copy mode (S411).

Figure 14:
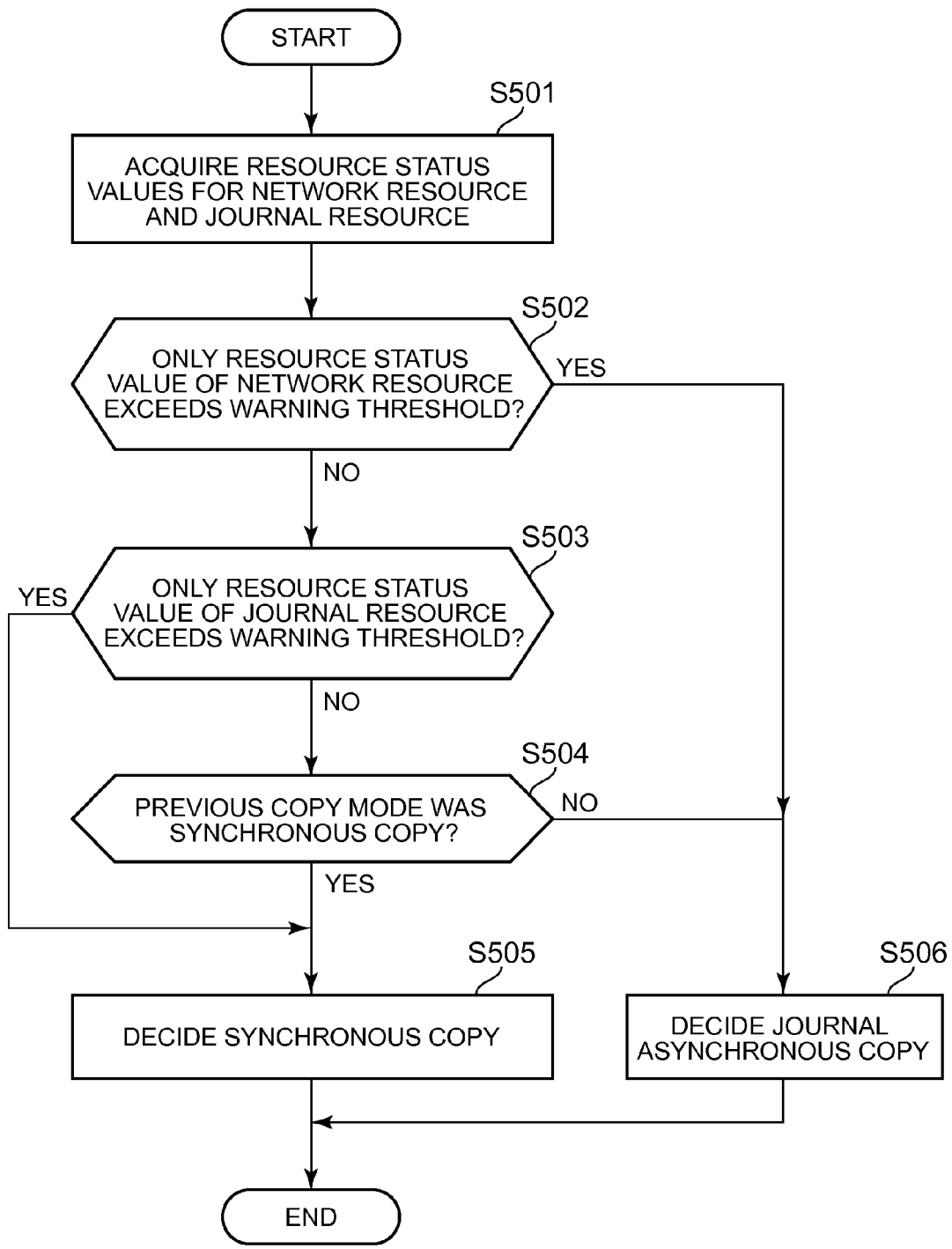
FIG. 14 is a flowchart of a copy mode decision process when the pre-change copy mode is a cache asynchronous copy.

FIG. 14 is a flowchart of the copy mode decision process when the pre-change copy mode is the cache asynchronous copy.

This process is equivalent to the processing of S305 in FIG. 12. Carrying out this process decides the post-change copy mode when the pre-change copy mode is the cache asynchronous copy.

First of all, the management server 3 management program 33 (copy mode manager 35) acquires the resource status value of the post-change-use resource (the target-resource to be used when the copy mode is changed) (S501). The post-change-use resource here comprises the network resource (hereinafter, "post-change-use network resource"), which is to be used when the copy mode is changed to a synchronous copy, and the post-change-use journal resource. The management program 33 acquires the respective resource status values of the post-change-use network resource and the post-change-use journal resource. This acquisition process is substantially the same as the processing of S403 of FIG. 13 (the post-change-use cache resource is simply replaced by the post-change-use network resource). Furthermore, in FIG. 14, the post-change-use network resource is notated simply as "network" (the same holds true in FIG. 15).

Next, the management program 33 determines whether or not only the resource status value of the post-change-use network resource exceeds the warning threshold (S502). More specifically, the management program 33 determines whether or not the resource status value of the post-change-use network resource acquired in S501 exceeds the warning threshold related to the network resource configured in the target copy unit 6. Further, the management program 33 determines whether or not the resource status value of the post-change-use journal resource acquired in S501 exceeds the warning threshold related to the journal resource configured in the target copy unit 6. Then, when the resource status value of the post-change-use network resource exceeds the warning threshold, but the resource status value of the post-change-use journal resource does not exceed the warning threshold, the management program 33 determines that the determination of S502 is "YES".

When only the resource status value of the post-change-use network resource exceeds the warning threshold (S502: YES), S506 is carried out.

Conversely, when the resource status value of the post-change-use network resource does not exceed the warning threshold, and the resource status value of the post-changeuse journal resource exceeds the warning threshold (S502: NO), the management program 33 determines whether or not only the resource status value of the post-change-use journal resource exceeds the warning threshold (S503). This process is substantially the same as the processing of S502 (only the determination criteria change).

When only the resource status value of the post-change-use journal resource exceeds the warning threshold (S503: YES), S505 is carried out.

Conversely, when the resource status value of the post-change-use network resource exceeds the warning threshold, and the resource status value of the post-change-use journal resource does not exceed the warning threshold (S503: NO), the management program 33 references the copy mode management table 39, and determines whether or not "synchronous" is configured in previous copy mode 393 of the target copy unit 6 (S504).

When "synchronous" is configured in previous copy mode 393 of the target copy unit 6 (S504: YES), S505 is carried out.

Conversely, when "synchronous" is not configured in previous copy mode 393 of the target copy unit 6 (S504: NO), S506 is carried out.

In S505, the management program 33 decides that the synchronous copy will be the post-change copy mode.

In S506, the management program 33 decides that the journal asynchronous copy will be the post-change copy mode.

Figure 15:
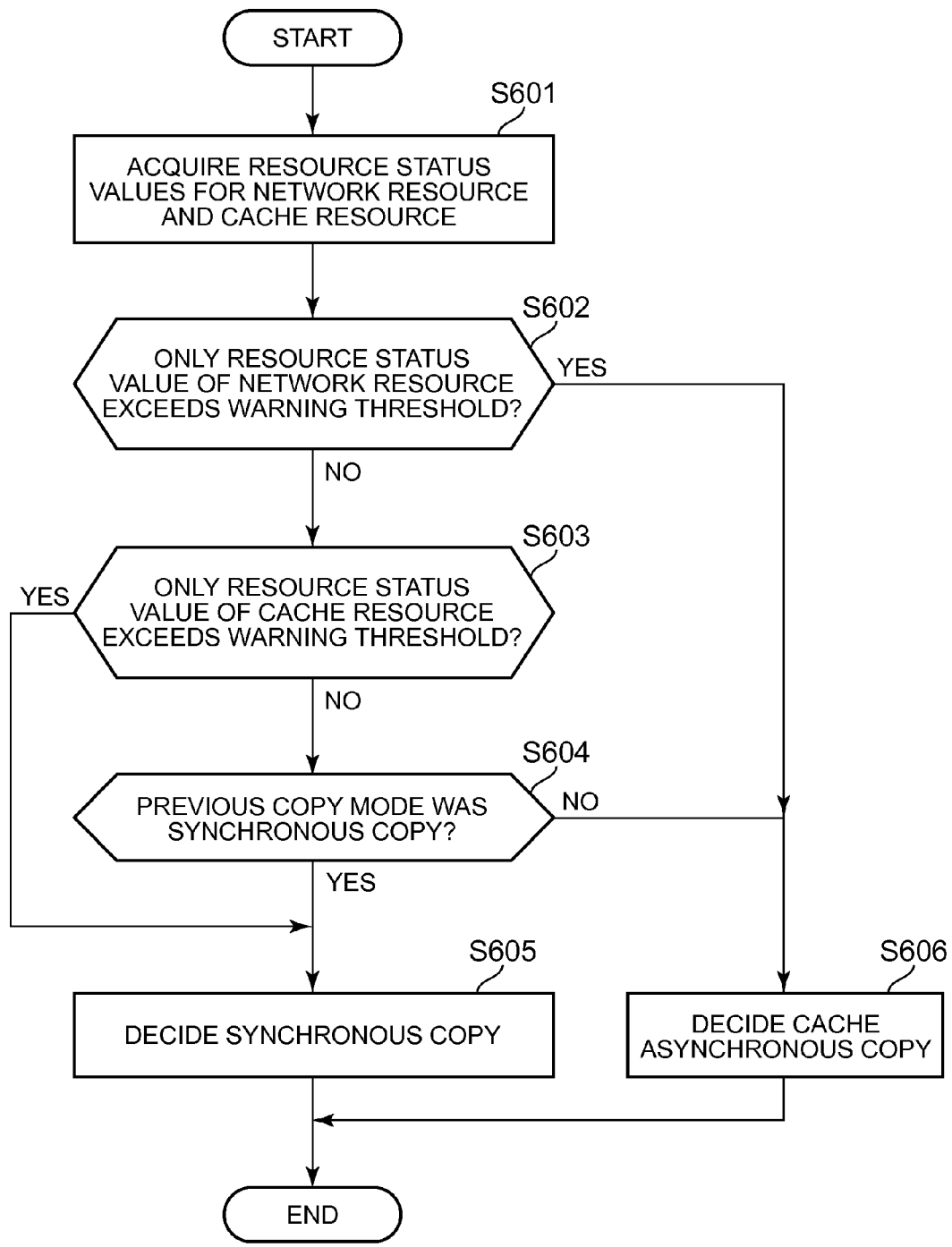
FIG. 15 is a flowchart of a copy mode decision process when the pre-change copy mode is a journal asynchronous copy.

FIG. 15 is a flowchart of the copy mode decision process when the pre-change copy mode is the journal asynchronous copy.

This process is equivalent to the processing of S305 of FIG. 12. Carrying out this process decides the post-change copy mode when the pre-change copy mode is the journal asynchronous copy. This process is substantially the same as the process of FIG. 14 (since the journal resource simply replaces the cache resource), and as such the explanation of this process will be omitted.

Figure 16:
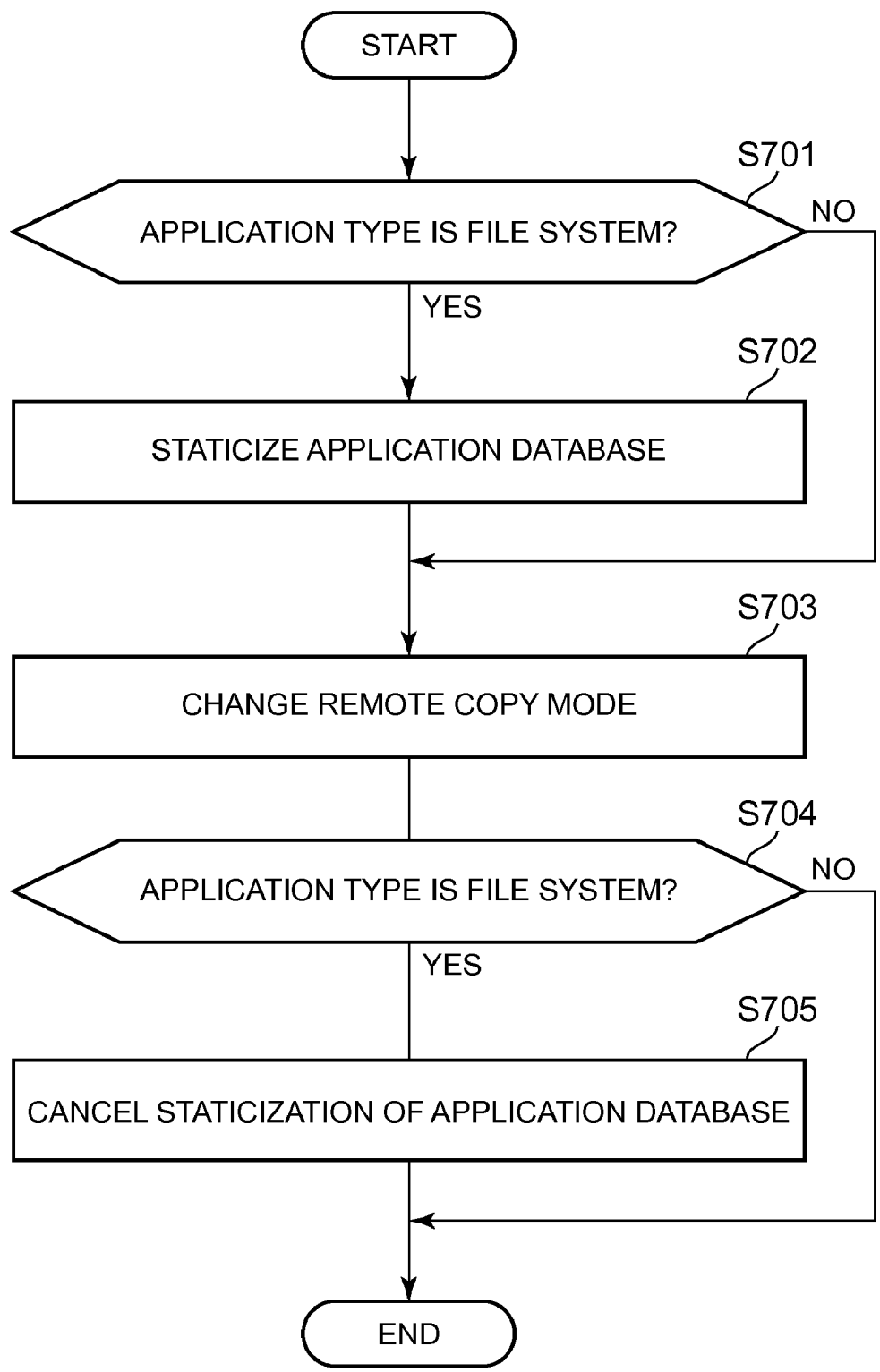
FIG. 16 is a flowchart of a copy mode change process.

FIG. 16 is a flowchart of the copy mode change process.

This process is equivalent to the processing of S308 of FIG. 12. Carrying out this process changes the copy mode of the target copy unit 6 to the post-change copy mode decided in the copy mode decision process (the process of FIGS. 13 through 15).

First of all, the management server 3 management program 33 (copy mode changer 36) references the copy configuration management table 37, and determines whether or not the application type of the application, which will access the data VOL 28 forming the target copy unit, 6 is a file system (S701).

When the application type is not file system (S701: NO), S703 is carried out.

Conversely, when the application type is file system (S701: YES), the management program 33 staticizes this application's database (that is, the data VOL 28 forming the target copy unit 6) (S702).

Thereafter, the management program 33 changes the copy mode of the target copy unit 6 to the post-change copy mode decided in the copy mode decision process (process of FIGS. 13 through 15) (S703). More specifically, this copy mode change is carried out using either of two methods shown in FIG. 19A and FIG. 19B.

Figure 19A:
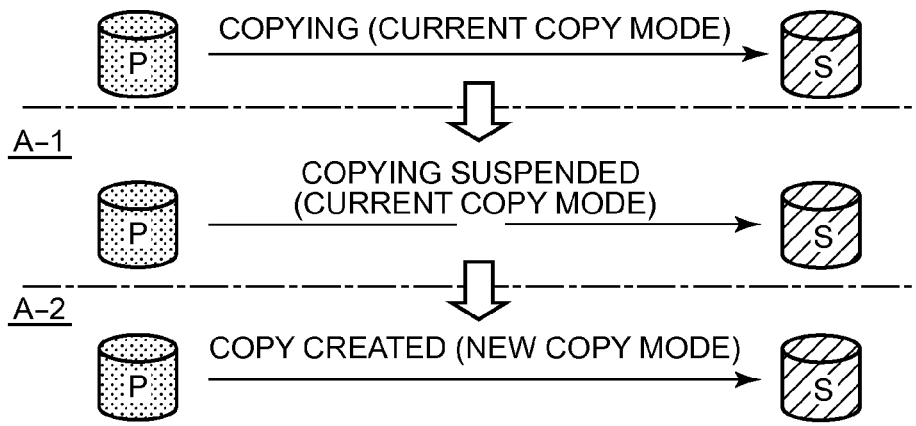
FIG. 19A is a schematic diagram of a first change method for a remote-copy mode.

In the first method shown in FIG. 19A, the management server 3 management program 33 requests that the monitoring program 13 of the business server 1 at the local site 8 change the copy mode employed by the target copy unit 6. The management program 33 sends this monitoring program 13 information showing the target copy unit 6, and information showing the post-change copy mode at this time. The monitoring program 13, which receives the copy mode change request, uses a storage system 2-provided command to temporarily split the PVOL-SVOL pair that forms the target copy unit 6 as shown in (A-1) of this figure. Then, the monitoring program 13 uses a storage system 2-provided command to configure the information showing the post-change copy mode received from the management program 33 for the target copy unit 6, and reconnects the temporarily split pair as shown in (A-2) of this figure. Consequently, the storage system 2 is able to carry out a remote copy in the target copy unit 6 using the post-change copy mode.

Figure 19B:
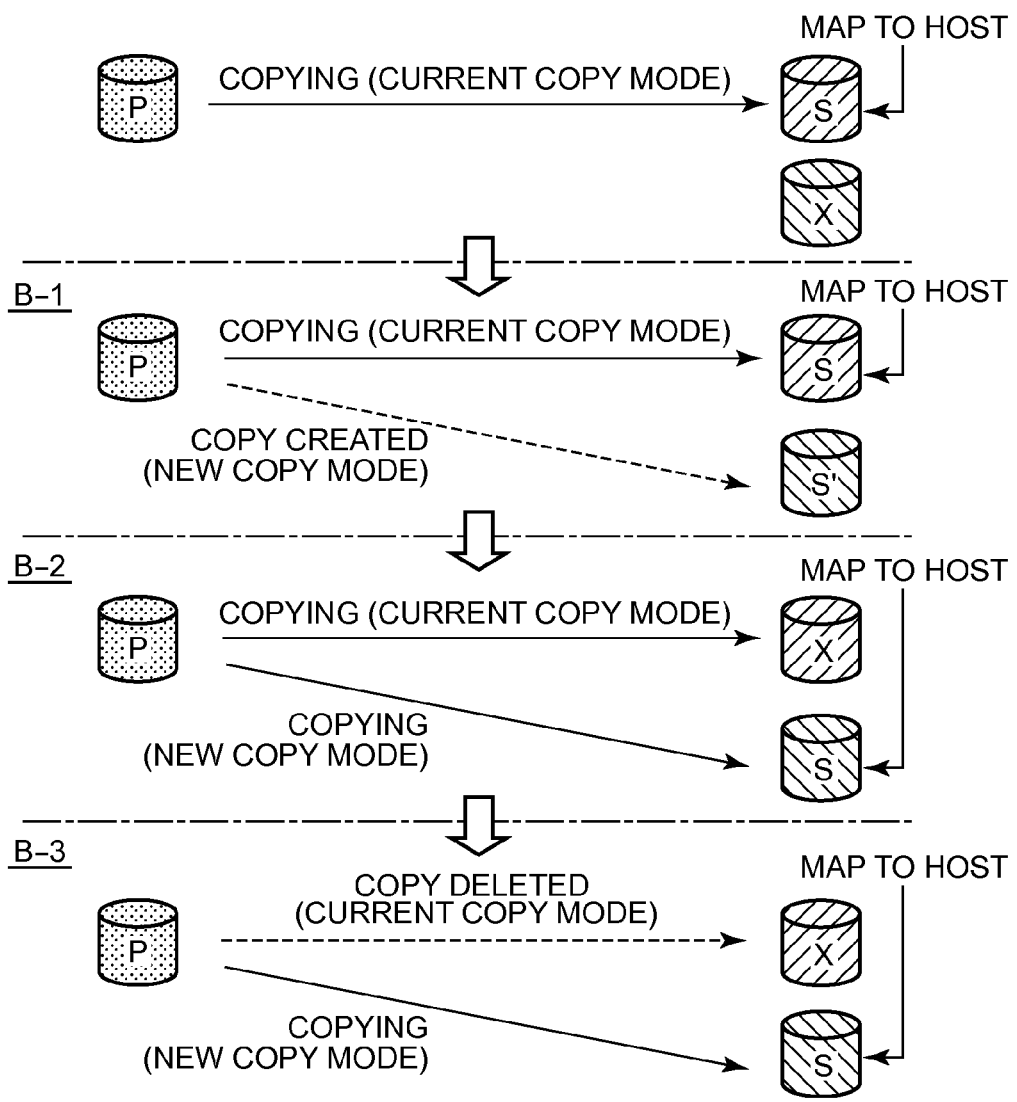
FIG. 19B is a schematic diagram of a second change method for a remote-copy mode.

In the second method shown in FIG. 19B, the management server 3 management program 33 requests that the monitoring program 13 of the business server 1 at the local site 8 change the copy mode employed by the target copy unit 6. The management program 33 sends this monitoring program 13 information showing the target copy unit 6, information showing the post-change copy mode, and also the data VOL identifier at this time. The monitoring program 13, which receives the copy mode change request, uses a storage system 2-provided command to create a new copy unit 6 (hereinafter, post-change target copy unit 6) created from the PVOL, which forms the target copy unit 6 (hereinafter, pre-change target copy unit 6) and the data VOL identified from the notified identifier (an unused LU 28 comprised in the same storage system 2 as the SVOL forming the pre-change target copy unit 6) as shown in (B-1) of this figure. Further, the monitoring program 13 uses a storage system 2-provided command to configure the information showing the post-change copy mode received from the management program 33 for the target copy unit 6. Consequently, the data stored in the PVOL forming the post-change target copy unit 6, is copied to the SVOL forming the post-change target copy unit 6 using the post-change copy mode. Thereafter, the management program 33 swaps the identifier of the SVOL forming the pre-change target copy unit 6 (hereinafter, the pre-change SVOL) and the identifier of the SVOL forming the post-change target copy unit 6 (hereinafter, the post-change SVOL), thereby making it so that the post-change SVOL is accessed when the pre-change SVOL is specified by the business server 1 as the access destination. In other words, as shown in (B-2) of this figure, the post-change SVOL is mapped to the business server 1 at the remote site 8 instead of the pre-change SVOL. Finally, the management program 33 deletes the pre-change target copy unit 6 as shown in (B-3) of this figure.

Subsequent to the above-described S703, the management program 33 references the copy configuration management table 37, and determines whether or not the application type of the application that will access the data VOL 28, which forms the target copy unit 6, is a file system (S704).

When the application type is not a file system (S704: NO), this process ends.

Conversely, when the application type is a file system (S704: YES), the management program 33 cancels the staticization of the database of the application (the database that was staticized in S702) (S705).

Figure 17:
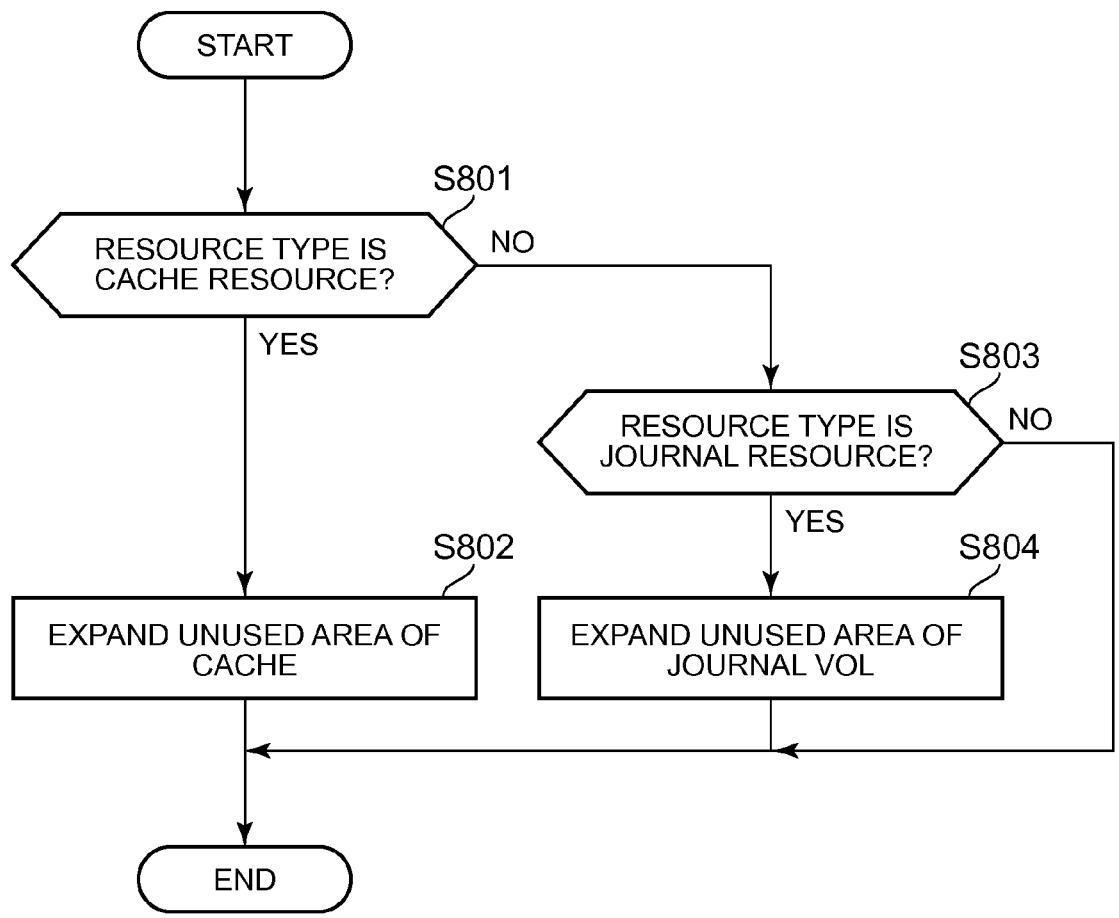
FIG. 17 is a flowchart of a resource expansion process.

FIG. 17 is a flowchart of a resource expansion process.

This process is equivalent to the processing of S310 of FIG. 12. Carrying out this process expands the target-resource (either the cache resource or the journal resource).

First, the management server 3 management program 33 determines whether or not the resource type of the target-resource used by the target copy unit 6 is "cache" (S801). If the target copy unit 6 is employing the cache asynchronous copy, the management program 33 determines that the resource type is "cache".

When the resource type of the target-resource used by the target copy unit 6 is "cache" (S801: YES), the management program 33 expands the cache resource, which is the target-resource used by the target copy unit 6 (usable storage area in the cache 26 comprised in the storage system 2 having the PVOL that forms the target copy unit 6) (S802). More specifically, the management program 33 requests that the monitoring program 13 of the business server 1 expand the target-resource used by the target copy unit 6. The management program 33 sends the monitoring program 13 information showing the target copy unit 6 at this time. The monitoring program 13, which receives the copy mode change request, uses a storage system 2-provided command to expand by a prescribed capacity the usable storage area of the cache 26 comprised in the storage system 2 having the PVOL, which forms the target copy unit 6.

Conversely, when the resource type of the target-resource used by the target copy unit 6 is not "cache" (S801: NO), the management program 33 determines whether or not the resource type of the target-resource used by the target copy unit 6 is "journal" (S803). If the target copy unit 6 is employing the journal asynchronous copy, the management program 33 determines that the resource type is "journal".

When the resource type of the target-resource used by the target copy unit 6 is "journal" (S803: YES), the management program 33 expands the target-resource used by the target copy unit 6 (usable storage area in the journal VOL 28 associated to the PVOL, which forms the target copy unit 6) (S804). This process is substantially the same as the processing of S802.

Conversely, when the resource type of the target-resource used by the target copy unit 6 is not "journal" (S803: NO), this process ends.

In either S802 or S804 of this process, the capacity to be expanded is not limited to a prescribed capacity, and for example, can be a capacity that the management program 33 specifies to the monitoring program 13.

Figure 18:
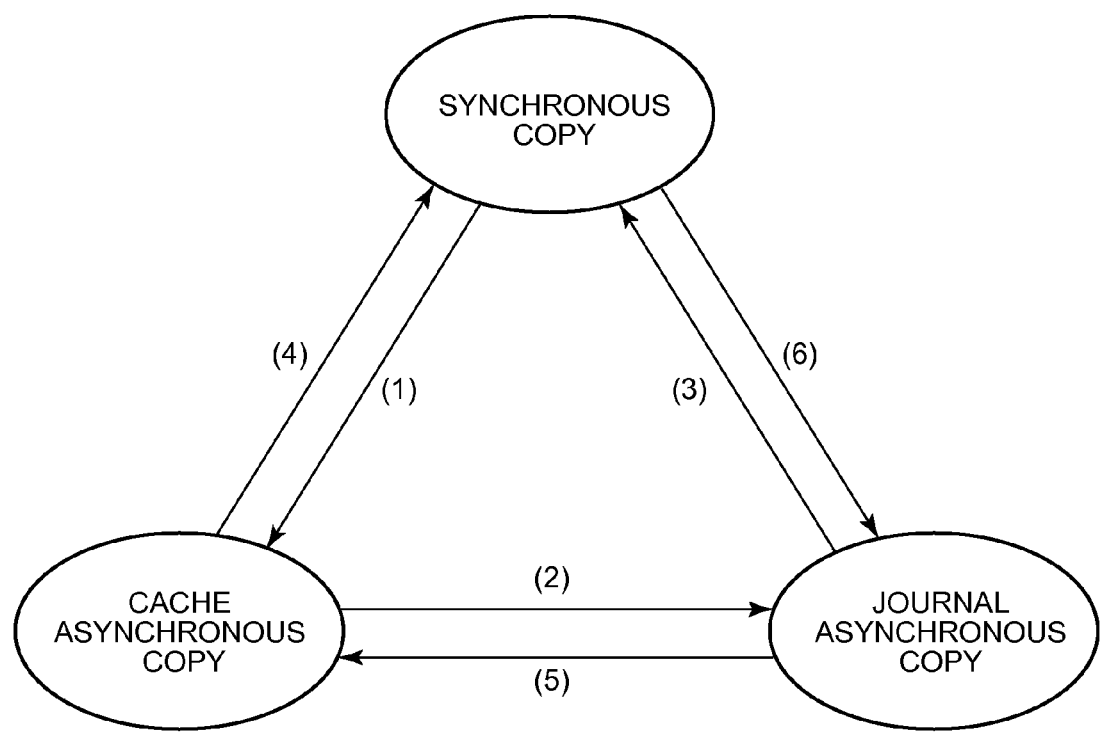
FIG. 18 is a diagram showing a use case related to a copy mode change in this embodiment.

FIG. 18 is a diagram showing a use case related to changing the copy mode in this embodiment.

In accordance with the explanations, which referred to FIGS. 11 through 15, a copy mode is changed as follows.

That is, when the pre-change copy mode is the synchronous copy, and the network function drops markedly (for example, when the transfer rate becomes conspicuously low), the copy mode is changed from the synchronous copy to either the cache asynchronous copy or the journal asynchronous copy (either (1) or (6) in this figure). As a case in which the copy mode is changed to the cache asynchronous copy, for example, any of the following can apply:

(A) the previous copy mode is the cache asynchronous copy;

(B) asynchronous C preferred is configured as the pre-ferred asynchronous; or (C) the percentage of residual capacity of the cache resource is greater than the percentage of residual capacity of the journal resource.

Conversely, as a case in which the copy mode is changed to the journal asynchronous copy, for example, any of the following can apply:

(a) the previous copy mode is the journal asynchronous copy;

(b) asynchronous J preferred is configured as the preferred asynchronous; or (c) the percentage of residual capacity of the journal resource is greater than the percentage of residual capacity of the cache resource.

When the pre-change copy mode is the cache asynchronous copy, and the network function has been improved, the copy mode is changed to the synchronous copy ((4) in the figure), and when there is insufficient usable area in the cache 26, the copy mode is changed to the journal asynchronous copy ((2) in the figure). The fact that the copy mode is changed to the journal asynchronous copy instead of the synchronous copy when the usable area in the cache 26 is insufficient is so that the asynchronous remote copy can continue.

When the pre-change copy mode is the journal asynchronous copy, and there is insufficient usable area in the journal VOL 28, the copy mode is changed to the synchronous copy ((3) in the figure), and when the usable area in the journal VOL 28 is insufficient, and priority is being placed on memory I/O performance more than disk I/O performance, the copy mode is changed to the cache asynchronous copy ((5) in the figure).

The numerous embodiments of the present invention described above are examples for explaining the present invention, and do not purport to limit the scope of the present invention solely to these embodiments. The present invention can be put into practice in a variety of other modes without departing from the gist thereof.

What is claimed is:

1. A management apparatus for managing a remote copy, which is a data copy from a first data volume of a first storage system to a second data volume of a second storage system, the management apparatus comprising:

a monitoring unit for either regularly or irregularly acquiring a resource status value showing a resource status of a resource to be utilized in a remote copy conforming to a copy mode configured for a copy unit created from the first data volume and the second data volume;

a determination unit for determining whether or not the acquired resource status value exceeds a prescribed threshold;

an action unit, which, when determination is made that the acquired resource status value exceeds the prescribed threshold, executes either a resource expansion process for increasing the resource to be used at the time of a remote copy, which conforms to the configured copy mode, or a copy mode change process for changing the configured copy mode to a different copy mode;

wherein the prescribed threshold comprises a prescribed first threshold, and a prescribed second threshold, which is at a lower level than the prescribed first threshold; and the action unit executes either the resource expansion process or the copy mode change process when the resource status value of the resource is determined to exceed the first threshold, or when the resource status value of the resource is determined not to exceed the first threshold, but the number of overruns, which is the number of times that the resource status value of the resource is determined to exceed the second threshold, exceeds a prescribed number of times.

2. The management apparatus according to claim 1, further comprising:

a counter for counting the number of overruns; and a copy mode decision unit for executing a copy mode decision process for deciding a candidate for the different copy mode in the copy mode change process, when the number of overruns does not exceed the prescribed number of times, the action unit, either when determination is made that the resource status value of the resource exceeds the first threshold, or when the number of overruns exceeds the prescribed number of times, executes the copy mode change process, which uses the candidate decided in the copy mode decision process as the different copy mode.

3. A management apparatus for managing a remote copy, which is a data copy from a first data volume of a first storage system to a second data volume of a second storage system, the management apparatus comprising:

a monitoring unit for either regularly or irregularly acquiring a resource status value showing a resource status of a resource to be utilized in a remote copy conforming to a copy mode configured for a copy unit created from the first data volume and the second data volume;

a determination unit for determining whether or not the acquired resource status value exceeds a prescribed threshold;

an action unit, which, when determination is made that the acquired resource status value exceeds the prescribed threshold, executes either a resource expansion process for increasing the resource to be used at the time of a remote copy, which conforms to the configured copy mode, or a copy mode change process for changing the configured copy mode to a different copy mode; and wherein the plurality of types of copy modes configurable for the copy unit comprise a first type copy mode to be used by a first type resource, which is a first data storage area included in the first storage system, and a second type copy mode to be used by a second type resource that differs from the first type resource, and resource expansion information showing whether or not the first type resource expands when determination is made that the resource status value of the first type resource exceeds a prescribed threshold determined for the first type resource is configured for the copy unit, the action unit, when determination is made that the resource status value of the first type resource exceeds the prescribed threshold determined for the first type resource, executes the resource expansion process for increasing the first type resource, or executes the copy mode change process for changing the copy mode configured for the copy unit from the first type copy mode to the second type copy mode.

4. The management apparatus according to claim 3, wherein the plurality of types of copy modes configurable for the copy unit comprise a synchronous copy by which the first data volume and the second data volume are synchronized; a cache asynchronous copy, which is an asynchronous remote copy, which uses a storage area in a first cache of the first storage system as a buffer; and a journal asynchronous copy, which is an asynchronous remote copy, which uses a storage area in a logical volume of the first storage system as a buffer, and which uses an updated journal for the first data volume, the first type copy mode is either the cache asynchronous copy or the journal asynchronous copy, and the second type copy mode is either the synchronous copy, the cache asynchronous copy, or the journal asynchronous copy.

5. A management apparatus for managing a remote copy, which is a data copy from a first data volume of a first storage system to a second data volume of a second storage system, the management apparatus comprising:

a monitoring unit for either regularly or irregularly acquiring a resource status value showing a resource status of a resource to be utilized in a remote copy conforming to a copy mode configured for a copy unit created from the first data volume and the second data volume;

a determination unit for determining whether or not the acquired resource status value exceeds a prescribed threshold;

an action unit, which, when determination is made that the acquired resource status value exceeds the prescribed threshold, executes either a resource expansion process for increasing the resource to be used at the time of a remote copy, which conforms to the configured copy mode, or a copy mode change process for changing the configured copy mode to a different copy mode; and wherein the plurality of types of copy modes configurable for the copy unit comprise a first type copy mode to be used by a first type resource, which is a first type data storage area of the first storage system; a second type copy mode to be used by a second type resource, which is a second type data storage area of the first storage system; and a third type copy mode, which decides that a third type resources is used, and the action unit, when the resource status value of the third type resource is determined to exceed the prescribed threshold determined for the third type resource, compares a percentage of an unused area of the first type data storage area, which is the first type resource, with a percentage of an unused area of the second type data storage area, which is the second type resource, and selects the copy mode which uses the resource that has a higher percentage of the unused area thereof, as the different copy mode in the copy mode change process.

6. The management apparatus according to claim 5, wherein the plurality of types of copy modes configurable for the copy unit comprise a synchronous copy by which the first data volume and the second data volume are synchronized; a cache asynchronous copy, which is an asynchronous remote copy, which uses a storage area in a first cache of the first storage system as a buffer; and a journal asynchronous copy, which is an asynchronous remote copy, which uses a storage area in a logical volume of the first storage system as a buffer, and which uses an update journal for the first data volume, the third type copy mode is the synchronous copy;

the first type copy mode is the cache asynchronous copy; and the second type copy mode is the journal asynchronous copy.

7. A management apparatus for managing a remote copy, which is a data copy from a first data volume of a first storage system to a second data volume of a second storage system, the management apparatus comprising:

a monitoring unit for either regularly or irregularly acquiring a resource status value showing a resource status of a resource to be utilized in a remote copy conforming to a copy mode configured for a copy unit created from the first data volume and the second data volume;

a determination unit for determining whether or not the acquired resource status value exceeds a prescribed threshold;

an action unit, which, when determination is made that the acquired resource status value exceeds the prescribed threshold, executes either a resource expansion process for increasing the resource to be used at the time of a remote copy, which conforms to the configured copy mode, or a copy mode change process for changing the configured copy mode to a different copy mode; and a previous copy mode storage unit for recording the previous copy mode, which is the previously configured type copy mode for the copy unit, in a prescribed storage area, wherein the action unit makes the previous copy mode stored in the prescribed storage area to be applied to the different copy mode in the copy mode change process when prescribed conditions match up.

* * * * *